US012806937B2

(12) United States Patent
Kimura

(10) Patent No.: US 12,806,937 B2
(45) Date of Patent: Nov. 24, 2026

(54) HUB ASSEMBLY AND WHEEL

(71) Applicant: SHIMANO INC., Sakai (JP)

(72) Inventor: Yuki Kimura, Sakai (JP)

(73) Assignee: SHIMANO INC., Sakai (JP)

( * ) Notice: Subject to any disclaimer, the term of this patent is extended or adjusted under 35 U.S.C. 154(b) by 246 days.

(21) Appl. No.: 18/751,349

(22) Filed: Jun. 24, 2024

(65) Prior Publication Data

US 2025/0388050 A1 Dec. 25, 2025

(51) Int. Cl.
*B60B 27/04* (2006.01)
*B60B 27/02* (2006.01)

(52) U.S. Cl.
CPC ............ *B60B 27/04* (2013.01); *B60B 27/023* (2013.01)

(58) Field of Classification Search
CPC ...... B60B 27/023; B60B 27/04; B60B 27/047
See application file for complete search history.

(56) References Cited

U.S. PATENT DOCUMENTS

| | | | | |
|---|---|---|---|---|
| 8,096,623 | B2 | 1/2012 | You | |
| 8,801,109 | B2 | 8/2014 | Tho | |
| 9,199,509 | B2 * | 12/2015 | Koshiyama | B60B 27/047 |
| 11,059,541 | B2 * | 7/2021 | Fujita | B60B 27/023 |
| 11,097,807 | B2 * | 8/2021 | Fujita | B60B 27/047 |
| 11,179,967 | B2 * | 11/2021 | Fujita | B60B 27/023 |
| 11,332,213 | B2 * | 5/2022 | Fujita | F16H 55/30 |
| 11,642,913 | B2 * | 5/2023 | Oka | F16D 3/06 301/6.9 |
| 11,858,292 | B2 * | 1/2024 | Yamazaki | B60B 27/0047 |
| 11,919,333 | B2 * | 3/2024 | Oka | B60B 27/023 |
| 12,049,932 | B2 * | 7/2024 | Oka | F16D 41/32 |
| 12,122,186 | B2 * | 10/2024 | King | B60B 27/047 |
| 12,286,194 | B2 * | 4/2025 | Fujita | B60B 27/04 |
| 12,510,125 | B2 * | 12/2025 | Nakajima | F16D 41/36 |

FOREIGN PATENT DOCUMENTS

| | | | | |
|---|---|---|---|---|
| DE | 102021212748 | A1 * | 6/2022 | B62M 9/10 |
| DE | 102022120459 | A1 * | 3/2023 | H02K 11/33 |
| DE | 102022128402 | A1 * | 5/2023 | B60B 27/047 |
| DE | 102022202511 | A1 * | 9/2023 | B60B 27/023 |
| DE | 102023105184 | A1 * | 10/2023 | B62J 45/423 |
| DE | 102023107784 | A1 * | 10/2023 | B62J 11/19 |
| DE | 102023107785 | A1 * | 10/2023 | B62J 45/412 |
| DE | 102023107786 | A1 * | 10/2023 | B60B 27/023 |
| TW | M645457 | U | 8/2023 | |

* cited by examiner

*Primary Examiner* — Adam D Rogers
(74) *Attorney, Agent, or Firm* — MORI & WARD, LLP

(57) ABSTRACT

A hub assembly includes a hub axle, a hub body, a sprocket support body, a one-way clutch, and a transmitting body. The hub body is rotatable relative to the hub axle about a rotational axis. The sprocket support body is rotatable relative to the hub axle about the rotational axis. The transmitting body is provided between the sprocket support body and the one-way clutch to transmit rotational force from the sprocket support body to the one-way clutch. The transmitting body is a separate member from the sprocket support body. The transmitting body includes an outer periphery configured to be engaged with the inner periphery of the sprocket support body.

20 Claims, 16 Drawing Sheets

HUB ASSEMBLY AND WHEEL

BACKGROUND

Technical Field

The present invention relates to a hub assembly and a wheel.

Background Information

A human-powered vehicle includes a wheel including a hub assembly. A sprocket assembly is mounted on a rotatable member of the hub assembly. One of objects of the present disclosure is to improve the design flexibility of the rotatable member. Another of the objects of the present disclosure is to improve the durability of the rotatable member. Another of the objects of the present disclosure is to enable the rotational force to be transmitted or interrupted between the rotatable member and a hub body.

SUMMARY

In accordance with a first aspect of the present invention, a hub assembly comprises a hub axle, a hub body, a sprocket support body, a one-way clutch, and a transmitting body. The hub body is rotatable relative to the hub axle about a rotational axis. The sprocket support body is rotatable relative to the hub axle about the rotational axis. The sprocket support body includes an external spline and an inner periphery. The external spline is configured to be engaged with an internal spline of a sprocket assembly of a human-powered vehicle. The one-way clutch is configured to restrict the sprocket support body from rotating relative to the hub body in a first rotational direction. The one-way clutch is configured to allow the sprocket support body to rotate relative to the hub body in a second rotational direction which is an opposite direction of the first rotational direction. The transmitting body is provided between the sprocket support body and the one-way clutch to transmit rotational force from the sprocket support body to the one-way clutch. The transmitting body is a separate member from the sprocket support body. The transmitting body includes an outer periphery configured to be engaged with the inner periphery of the sprocket support body.

With the hub assembly according to the first aspect, the transmitting body is a separate member from the sprocket support body, and the outer periphery of the transmitting body is configured to be engaged with the inner periphery of the sprocket support body. Thus, it is possible to improve the design flexibility of the sprocket support body and the transmitting body while transmitting the rotational force from the sprocket support body to the one-way clutch via the transmitting body.

In accordance with a second aspect of the present invention, the hub assembly according to the first aspect is configured so that the sprocket support body is made of a first material. The transmitting body is made of a second material. The first material has hardness higher than hardness of the second material.

With the hub assembly according to the second aspect, the first material improves the durability of the sprocket support body while the second material makes it easier to manufacture the transmitting body.

In accordance with a third aspect of the present invention, a hub assembly comprises a hub axle, a hub body, a sprocket support body, a one-way clutch, and a transmitting body.

The hub body is rotatable relative to the hub axle about a rotational axis. The sprocket support body is rotatable relative to the hub axle about the rotational axis. The sprocket support body includes an external spline configured to be engaged with an internal spline of a sprocket assembly of a human-powered vehicle. The sprocket support body is made of a first material. The one-way clutch is configured to restrict the sprocket support body from rotating relative to the hub body in a first rotational direction. The one-way clutch is configured to allow the sprocket support body to rotate relative to the hub body in a second rotational direction which is an opposite direction of the first rotational direction. The transmitting body is provided between the sprocket support body and the one-way clutch to transmit rotational force from the sprocket support body to the one-way clutch. The transmitting body is made of a second material. The first material has hardness higher than hardness of the second material.

With the hub assembly according to the third aspect, the first material improves the durability of the sprocket support body while the second material makes it easier to manufacture the transmitting body.

In accordance with a fourth aspect of the present invention, the hub assembly according to any one of the first to third aspects is configured so that the one-way clutch includes a first ratchet member and a second ratchet member. The first ratchet member is coupled to the transmitting body to rotate along with the transmitting body relative to the hub body. The second ratchet member is coupled to the hub body to rotate along with the hub body relative to the transmitting body.

With the hub assembly according to the fourth aspect, the first ratchet member and the second ratchet member enable the rotational force to be transmitted or interrupted between the transmitting body and the hub body.

In accordance with a fifth aspect of the present invention, a hub assembly comprises a hub axle, a hub body, a sprocket support body, a one-way clutch, and a transmitting body. The hub body is rotatable relative to the hub axle about a rotational axis. The sprocket support body is rotatable relative to the hub axle about the rotational axis. The sprocket support body includes an external spline configured to be engaged with an internal spline of a sprocket assembly of a human-powered vehicle. The one-way clutch is configured to restrict the sprocket support body from rotating relative to the hub body in a first rotational direction. The one-way clutch is configured to allow the sprocket support body to rotate relative to the hub body in a second rotational direction which is an opposite direction of the first rotational direction. The transmitting body is provided between the sprocket support body and the one-way clutch to transmit rotational force from the sprocket support body to the one-way clutch. The one-way clutch includes a first ratchet member and a second ratchet member. The first ratchet member is coupled to the transmitting body to rotate along with the transmitting body relative to the hub body. The second ratchet member is coupled to the hub body to rotate along with the hub body relative to the transmitting body.

With the hub assembly according to the fifth aspect, the first ratchet member and the second ratchet member enable the rotational force to be transmitted or interrupted between the transmitting body and the hub body.

In accordance with a sixth aspect of the present invention, the hub assembly according to the fourth or fifth aspect is configured so that the transmitting body includes a helical spline configured to be engaged with the first ratchet member to movably support the first ratchet member in an axial direction in response to relative rotation between the transmitting body and the first ratchet member. The axial direction is defined along the rotational axis.

With the hub assembly according to the sixth aspect, the helical spline enables the first ratchet member to be moved relative to the transmitting body in the axial direction in response to the relative rotation between the transmitting body and the first ratchet member.

In accordance with a seventh aspect of the present invention, the hub assembly according to any one of the first to sixth aspects is configured so that the sprocket support body includes a tubular portion extending circumferentially about the rotational axis. The external spline includes at least one external spline tooth protruding radially outwardly from the tubular portion to be engaged with the internal spline of the sprocket assembly.

With the hub assembly according to the seventh aspect, the tubular portion improves the rigidity of the sprocket support body.

In accordance with an eighth aspect of the present invention, the hub assembly according to any one of the first to seventh aspects is configured so that the outer periphery of the transmitting body includes a first spline configured to be free of being engaged with the internal spline of the sprocket assembly. The inner periphery of the sprocket support body includes a second spline configured to be engaged with the first spline.

With the hub assembly according to the eighth aspect, the first spline and the second spline enable the rotational force to be transmitted between the sprocket support body and the transmitting body.

In accordance with a ninth aspect of the present invention, the hub assembly according to the eighth aspect is configured so that the first spline includes at least one first spline tooth. The at least one first spline tooth includes a first contact surface and a first inclined surface. The first contact surface is contactable with the second spline to receive rotational force from the sprocket support body. The first inclined surface is inclined relative to the first contact surface. The first inclined surface extends away from the first contact surface to reduce a distance defined between the rotational axis and the first inclined surface.

With the hub assembly according to the ninth aspect, the first inclined surface makes the circumferential width of the at least one first spline longer, improving the strength of the at least one first spline tooth.

In accordance with a tenth aspect of the present invention, the hub assembly according to any one of the first to seventh aspects is configured so that the outer periphery of the transmitting body includes a first externally threaded portion. The inner periphery of the sprocket support body includes a second internally threaded portion configured to be engaged with the first externally threaded portion.

With the hub assembly according to the tenth aspect, it is possible to simplify the structures of the outer periphery and the inner periphery.

In accordance with an eleventh aspect of the present invention, the hub assembly according to any one of the first to tenth aspects further comprises a coupling member configured to couple the sprocket support body and the transmitting body.

With the hub assembly according to the eleventh aspect, it is possible to reliably couple the sprocket support body and the transmitting body.

In accordance with a twelfth aspect of the present invention, the hub assembly according to the eleventh aspect is configured so that the coupling member is configured to be engaged with the transmitting body.

With the hub assembly according to the twelfth aspect, it is possible to more reliably couple the sprocket support body and the transmitting body.

In accordance with a thirteenth aspect of the present invention, the hub assembly according to the eleventh or twelfth aspect is configured so that the coupling member is configured to be threadedly engaged with the transmitting body.

With the hub assembly according to the thirteenth aspect, it is possible to more reliably couple the sprocket support body and the transmitting body.

In accordance with a fourteenth aspect of the present invention, the hub assembly according to any one of the eleventh to thirteenth aspects is configured so that the coupling member includes a positioning surface configured to position the sprocket support body relative to the transmitting body in an axial direction in a coupling state where the coupling member couples the sprocket support body and the transmitting body. The axial direction is defined along the rotational axis.

With the hub assembly according to the fourteenth aspect, it is possible to more reliably couple the sprocket support body and the transmitting body.

In accordance with a fifteenth aspect of the present invention, the hub assembly according to the fourteenth aspect further comprises an intermediate member provided between the sprocket support body and the positioning surface of the sprocket support body in the axial direction in the coupling state.

With the hub assembly according to the fifteenth aspect, the intermediate member reduces the surface pressure applied between the sprocket support body and the coupling member. Thus, it is possible to improve the durability of at least one of the sprocket support body and the coupling member.

In accordance with a sixteenth aspect of the present invention, the hub assembly according to any one of the eleventh to fifteenth aspects is configured so that the coupling member is configured to contact a first bearing configured to rotatably support the coupling member relative to the hub axle.

With the hub assembly according to the sixteenth aspect, it is possible to rotatably support the sprocket support body with the coupling member and the first bearing.

In accordance with a seventeenth aspect of the present invention, the hub assembly according to any one of the eleventh to sixteenth aspects further comprises a stopper configured to position the sprocket support body, the transmitting body, and the coupling member relative to the hub axle in an axial direction defined along the rotational axis. The first seal member is provided between the stopper and at least one of the sprocket support body and the coupling member to restrict a foreign object from entering a space provided between the coupling member and the stopper.

With the hub assembly according to the seventeenth aspect, the first seal member can restrict the foreign object from entering the space provided between the coupling member and the stopper.

In accordance with an eighteenth aspect of the present invention, the hub assembly according to any one of the first to seventeenth aspects further comprises a second seal member provided between the hub body and the transmitting body to restrict a foreign object from entering a space provided between the hub body and the transmitting body.

With the hub assembly according to the eighteenth aspect, the second seal member 58 can restrict the foreign object from entering the space provided between the hub body and the transmitting body.

In accordance with a nineteenth aspect of the present invention, the hub assembly according to any one of the first to eighteenth aspects is configured so that the transmitting body is configured to contact a second bearing configured to rotatably support the transmitting body relative to the hub axle.

With the hub assembly according to the nineteenth aspect, it is possible to rotatably support the sprocket support body with the transmitting body and the second bearing.

In accordance with a twentieth aspect of the present invention, a wheel comprises the hub assembly according to any one of the first to nineteenth aspects.

With the wheel according to the twentieth aspect, the transmitting body is a separate member from the sprocket support body, and the outer periphery of the transmitting body is configured to be engaged with the inner periphery of the sprocket support body. Thus, it is possible to improve the design flexibility of the sprocket support body and the transmitting body while transmitting the rotational force from the sprocket support body to the one-way clutch via the transmitting body.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
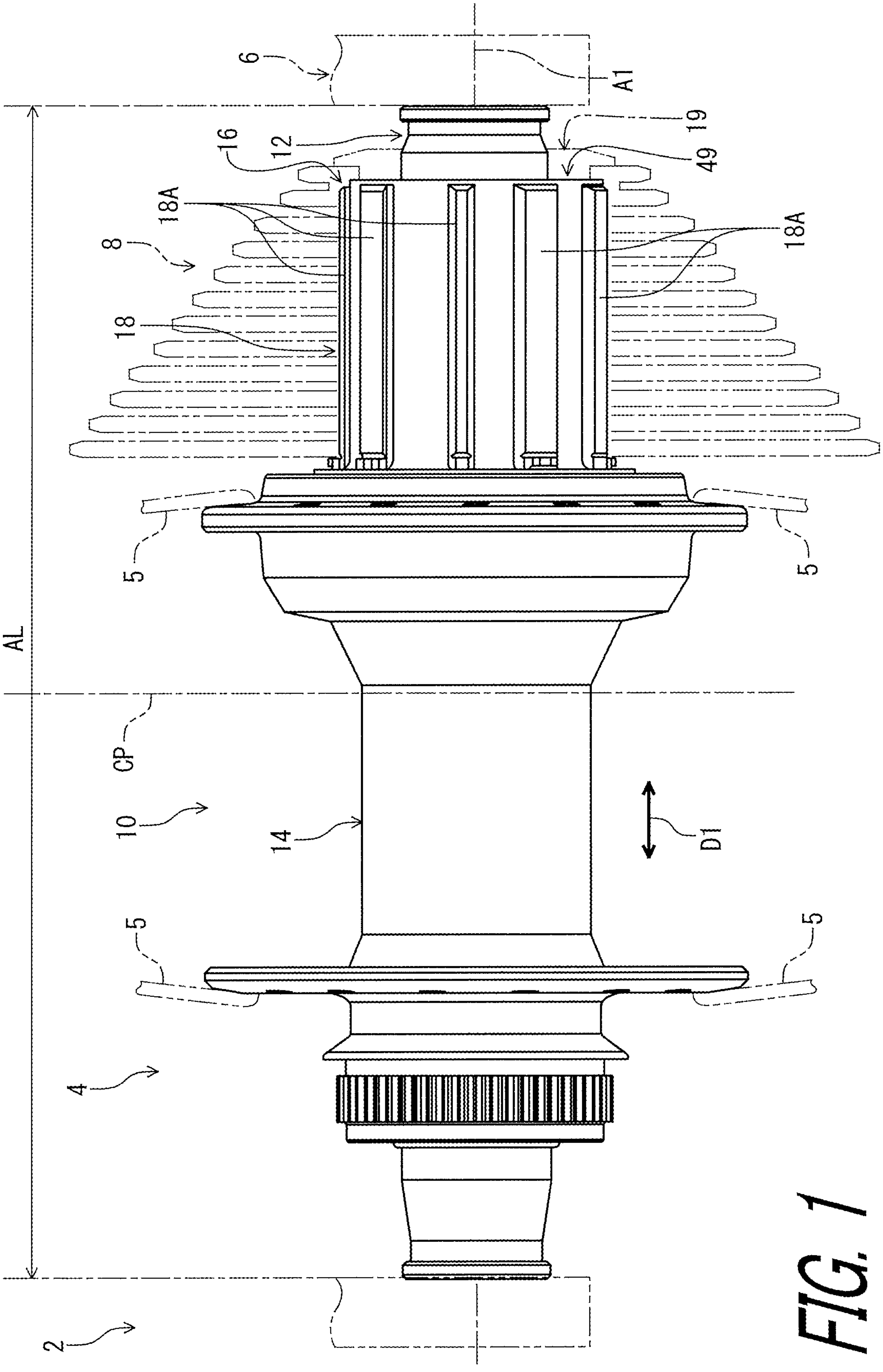
FIG. 1 is a side elevational view of a human-powered vehicle including a wheel including a hub assembly in accordance with one of embodiments.

The embodiments will now be described with reference to the accompanying drawings, wherein like reference numerals designate corresponding or identical elements throughout the various drawings.

Figure 2:
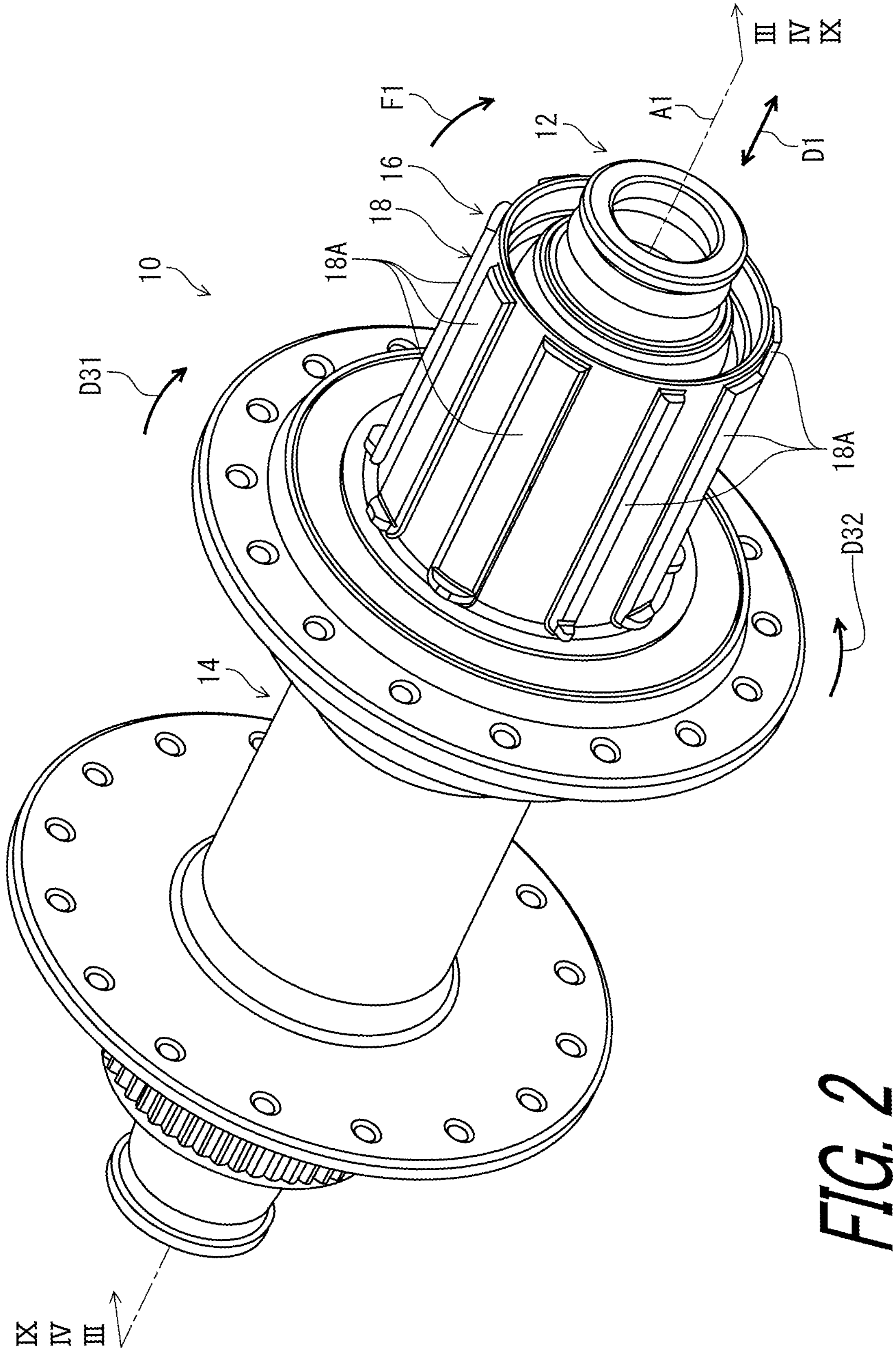
FIG. 2 is a perspective view of the hub assembly illustrated in FIG. 1.

As seen in FIGS. 1 and 2, a human-powered vehicle 2 includes a wheel 4. The wheel 4 comprises a hub assembly 10. The hub assembly 10 comprises a hub axle 12, a hub body 14, and a sprocket support body 16. The hub axle 12 has a rotational axis A1. The hub axle 12 extends along the rotational axis A1. The hub body 14 is rotatable relative to the hub axle 12 about the rotational axis A1. The hub body 14 is rotatably mounted on the hub axle 12 to rotate about the rotational axis A1. The sprocket support body 16 is rotatable relative to the hub axle 12 about the rotational axis A1. The sprocket support body 16 is rotatably mounted on the hub axle 12 to rotate about the rotational axis A1. The hub body 14 is configured to be coupled to at least two spokes 5 of the wheel 4. The hub body 14 is coupled to a rim of the wheel 4 with the at least two spokes 5.

In the present application, the term "human-powered vehicle" includes a vehicle to travel with a motive power including at least a human power of a user who rides the vehicle. The human-powered vehicle includes a various kind of bicycles such as a mountain bike, a road bike, a city bike, a cargo bike, a hand bike, and a recumbent bike. Furthermore, the human-powered vehicle includes an electric bike called as an E-bike. The electric bike includes an electrically assisted bicycle configured to assist propulsion of a vehicle with an electric motor. However, a total number of wheels of the human-powered vehicle is not limited to two. For example, the human-powered vehicle includes a vehicle having one wheel or three or more wheels. Especially, the human-powered vehicle does not include a vehicle that uses only a driving source as motive power. Examples of the driving source include an internal-combustion engine and an electric motor. Generally, a light road vehicle, which includes a vehicle that does not require a driver's license for a public road, is assumed as the human-powered vehicle.

In the present application, the following directional terms "front," "rear," "forward," "rearward," "left," "right," "transverse," "upward" and "downward" as well as any other similar directional terms refer to those directions which are determined on the basis of the user who is in the user's standard position in the human-powered vehicle 2 with facing a handlebar or steering. Examples of the user's standard position include a saddle and a seat. Accordingly, these terms, as utilized to describe the hub assembly 10 or other components, should be interpreted relative to the human-powered vehicle 2 equipped with the hub assembly 10 or other components as used in an upright riding position on a horizontal surface.

As seen in FIG. 1, the hub axle 12 is configured to be secured to a vehicle body 6 of the human-powered vehicle 2 with a hub securing structure. The sprocket support body 16 is configured to support a sprocket assembly 8 including at least one sprocket. The sprocket support body 16 is coupled to the sprocket assembly 8 to rotate integrally with the sprocket assembly 8 about the rotational axis A1.

The sprocket support body 16 includes an external spline 18. The external spline 18 is configured to be engaged with an internal spline of the sprocket assembly 8 of the human-powered vehicle 2. The external spline 18 includes at least one external spline tooth 18A. The at least one external spline tooth 18A is configured to be engaged with at least one internal spline tooth of the internal spline of the sprocket assembly 8. In the present embodiment, the external spline 18 includes at least two external spline teeth 18A. The at least two external spline teeth 18A are configured to be engaged with at least two internal spline teeth of the internal spline of the sprocket assembly 8.

An axial center plane CP is defined to bisect an axial length AL of the hub assembly 10 in an axial direction D1. The axial direction D1 is defined along the rotational axis A1. The axial center plane CP is perpendicular to the rotational axis A1.

The hub assembly 10 includes a lock member 19. The lock member 19 is configured to be coupled to the sprocket support body 16 to fasten the sprocket assembly 8 to the sprocket support body 16. The lock member 19 is configured to be threadedly engaged with the sprocket support body 16.

Figure 3:
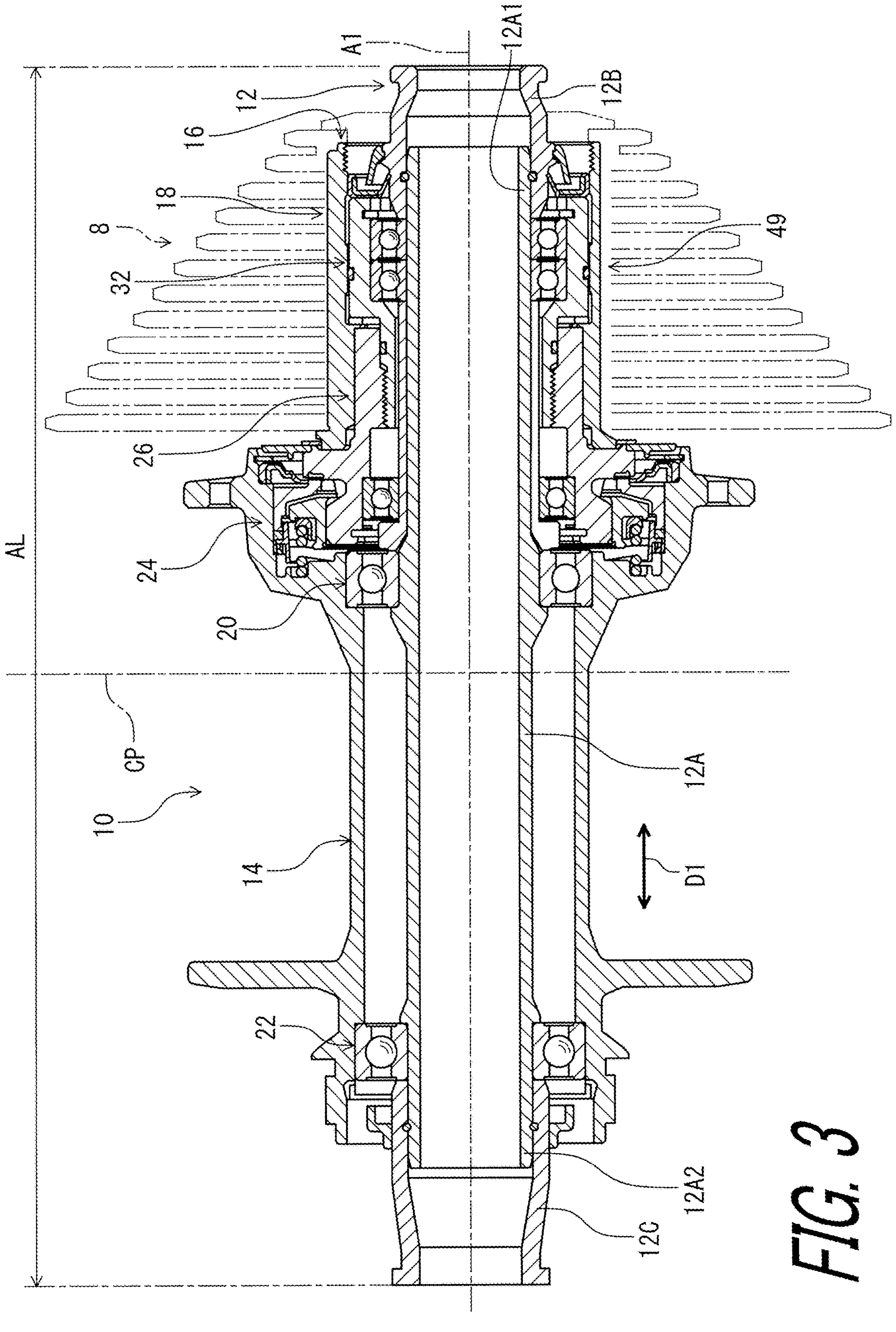
FIG. 3 is a cross-sectional view of the hub assembly taken along line III-III of FIG. 2.

As seen in FIG. 3, the hub assembly 10 comprises a first hub bearing 20. The first hub bearing 20 is provided radially between the hub axle 12 and the hub body 14. The first hub bearing 20 is configured to rotatably support the hub body 14 relative to the hub axle 12 about the rotational axis A1.

The hub assembly 10 comprises a second hub bearing 22. The second hub bearing 22 is provided radially between the hub axle 12 and the hub body 14. The second hub bearing 22 is configured to rotatably support the hub body 14 relative to the hub axle 12 about the rotational axis A1.

As seen in FIG. 3, the hub assembly 10 comprises a one-way clutch 24. The one-way clutch 24 is configured to restrict the sprocket support body 16 from rotating relative to the hub body 14 in a first rotational direction D31 (see e.g., FIG. 2). Thus, as seen in FIG. 2, rotational force F1 such as pedaling torque is transmitted from the sprocket support body 16 to the hub body 14 in the first rotational direction D31 in a case where the sprocket support body 16 receives the rotational force F1 in the first rotational direction D31.

As seen in FIG. 3, the one-way clutch 24 is configured to allow the sprocket support body 16 to rotate relative to the hub body 14 in a second rotational direction D32 (see e.g., FIG. 2) which is an opposite direction of the first rotational direction D31. Namely, the one-way clutch 24 is configured to allow the hub body 14 to rotate relative to the sprocket support body 16 about the rotational axis A1 in the first rotational direction D31 (see e.g., FIG. 2) during coasting.

Figure 4:
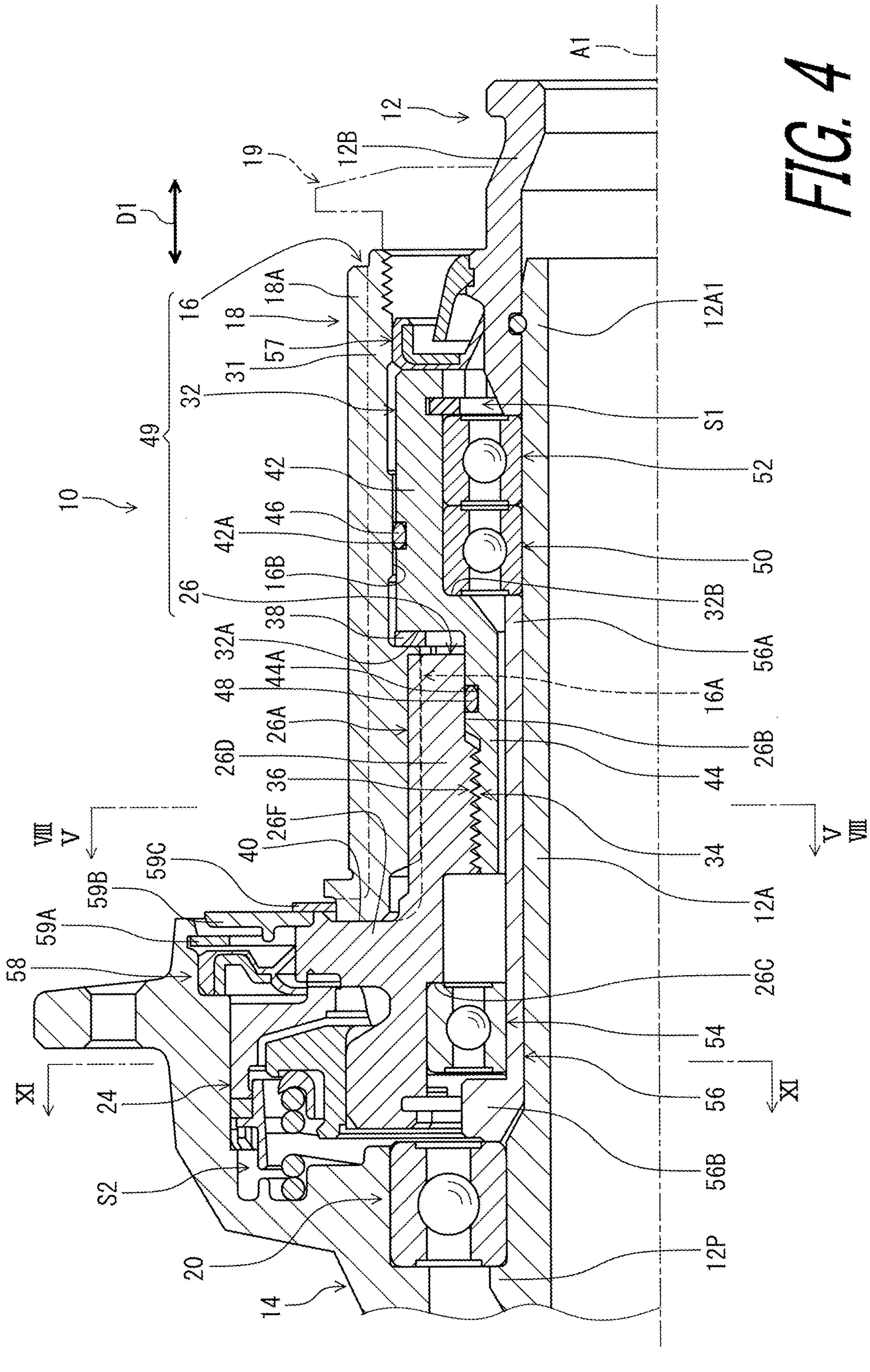
FIG. 4 is a partial cross-sectional view of the hub assembly taken along line IV-IV of FIG. 2.

As seen in FIG. 4, the hub assembly 10 comprises a transmitting body 26. The transmitting body 26 is provided between the sprocket support body 16 and the one-way clutch 24 to transmit the rotational force F1 (see e.g., FIG. 2) from the sprocket support body 16 to the one-way clutch 24. The transmitting body 26 is a separate member from the sprocket support body 16.

The sprocket support body 16 includes an inner periphery 16A. The transmitting body 26 includes an outer periphery 26A configured to be engaged with the inner periphery 16A of the sprocket support body 16. The transmitting body 26 is coupled with the sprocket support body 16 via the inner periphery 16A and the outer periphery 26A to rotate relative to the hub axle 12 about the rotational axis A1 along with the sprocket support body 16.

The transmitting body 26 includes a tubular portion 26D and a flange portion 26F. The tubular portion 26D extends from the flange portion 26F in the axial direction D1. The outer periphery 26A is provided on the tubular portion 26D.

Figure 5:
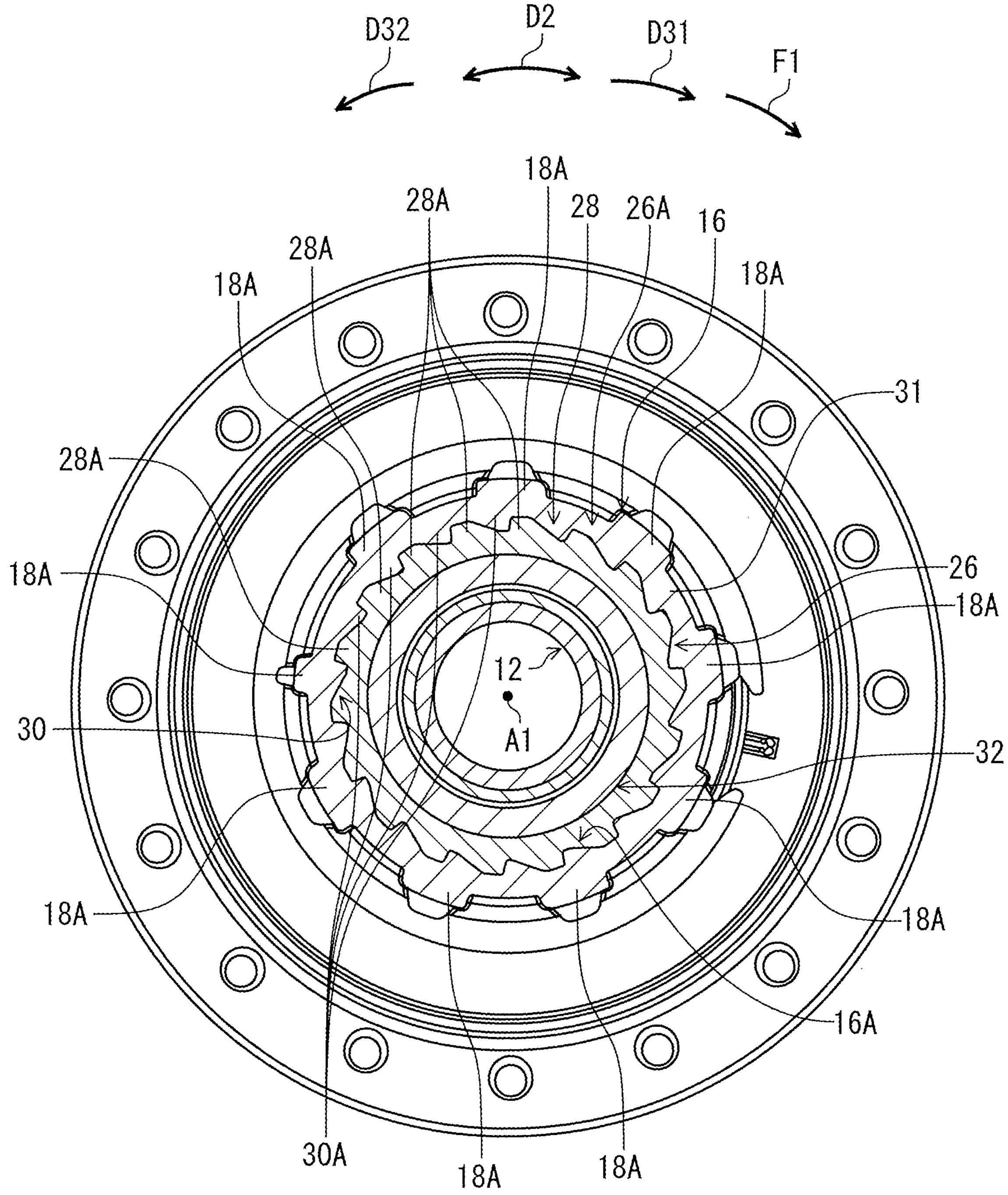
FIG. 5 is a cross-sectional view of the hub assembly taken along line V-V of FIG. 4.

As seen in FIG. 5, the outer periphery 26A of the transmitting body 26 includes a first spline 28. The first spline 28 is configured to be free of being engaged with the internal spline of the sprocket assembly 8 (see e.g., FIG. 4). The inner periphery 16A of the sprocket support body 16 includes a second spline 30. The second spline 30 is configured to be engaged with the first spline 28.

The first spline 28 includes at least one first spline tooth 28A. In the present embodiment, the first spline 28 includes at least two first spline teeth 28A. The at least two first spline teeth 28A are arranged in a circumferential direction D2 defined about the rotational axis A1.

The second spline 30 includes at least one second spline tooth 30A. The at least one second spline tooth 30A is configured to mesh with the at least one first spline tooth 28A. In the present embodiment, the second spline 30 includes at least two second spline teeth 30A. The at least two second spline teeth 30A are arranged in the circumferential direction D2. The at least two second spline teeth 30A are configured to mesh with the at least two first spline teeth 28A.

Figure 6:
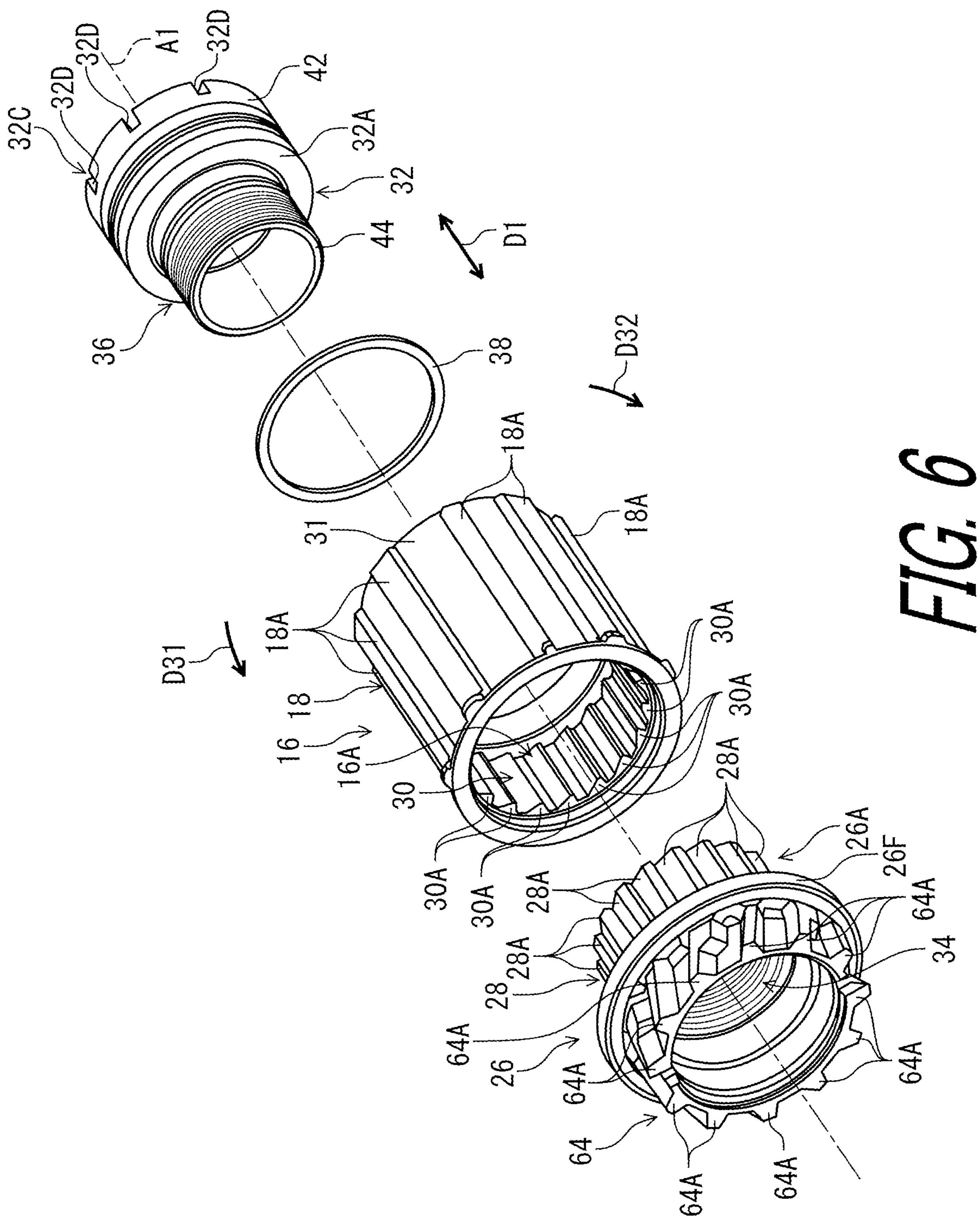
FIG. 6 is an exploded perspective view of a part of the hub assembly illustrated in FIG. 1.
Figure 7:
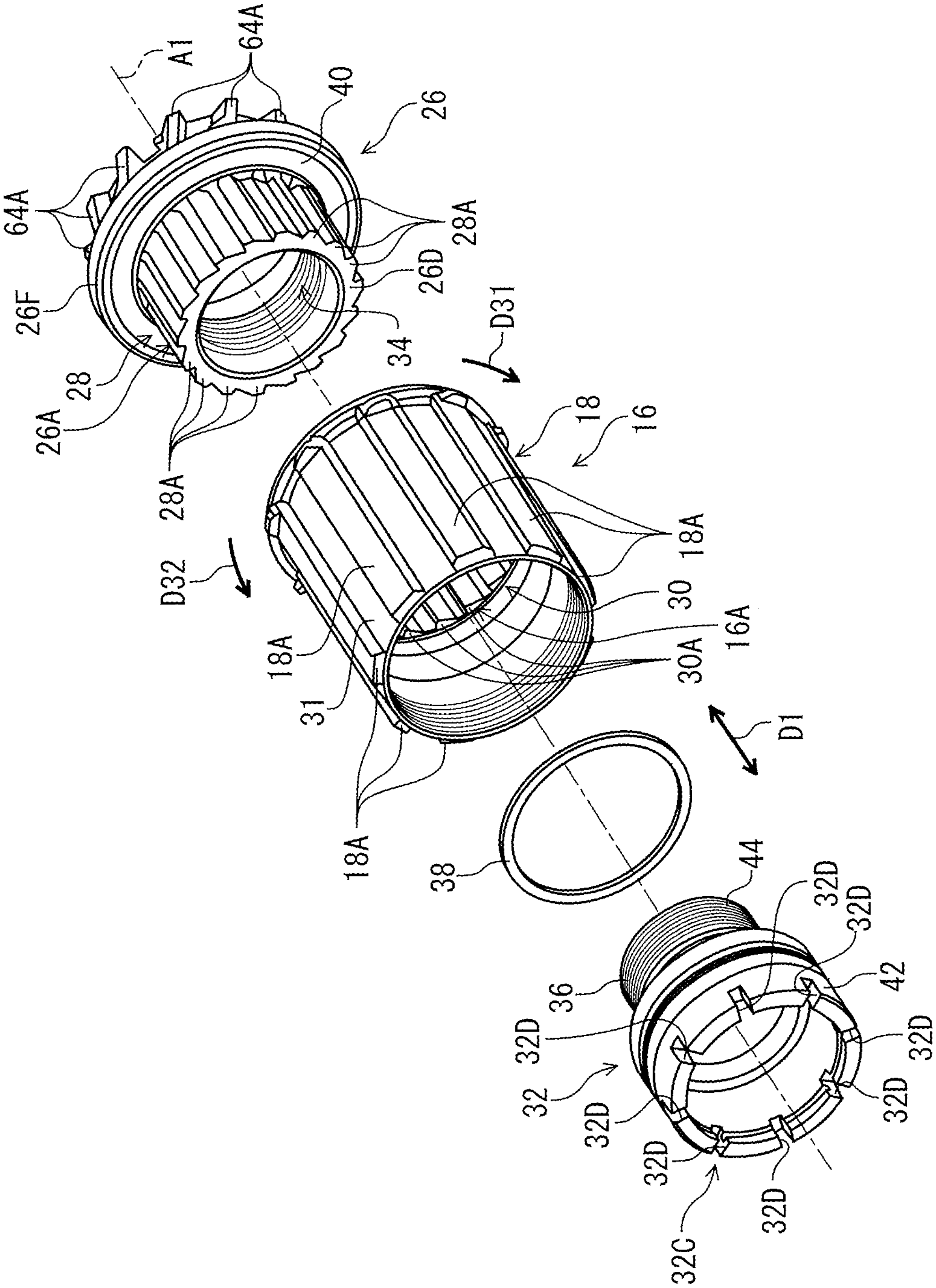
FIG. 7 is another exploded perspective view of a part of the hub assembly illustrated in FIG. 1.

As seen in FIGS. 6 and 7, the at least one first spline tooth 28A extends in the axial direction D1. The at least one second spline tooth 30A extends in the axial direction D1. The at least one external spline tooth 18A extends in the axial direction D1.

The sprocket support body 16 includes a tubular portion 31. The tubular portion 31 extends circumferentially about the rotational axis A1. The external spline 18 is provided on the tubular portion 31. The at least one external spline tooth 18A is provided on the tubular portion 31 to extend in the axial direction D1. The at least one external spline tooth 18A is provided on the outer peripheral surface of the tubular portion 31 to extend in the axial direction D1.

The at least one external spline tooth 18A protrudes radially outwardly from the tubular portion 31 to be engaged with the internal spline of the sprocket assembly 8. The at least two external spline teeth 18A protrude radially outwardly from the tubular portion 31 to be engaged with the internal spline of the sprocket assembly 8. The at least one external spline tooth 18A protrudes radially outwardly from an outer peripheral surface of the tubular portion 31. The at least two external spline teeth 18A protrude radially outwardly from an outer peripheral surface of the tubular portion 31.

As seen in FIG. 5, the at least one second spline tooth 30A protrudes radially inwardly from the tubular portion 31. The at least two second spline teeth 30A protrude radially inwardly from the tubular portion 31.

In the present embodiment, a total number of the at least one external spline tooth 18A is nine. A total number of the at least one first spline tooth 28A is 18. A total number of the at least one second spline tooth 30A is 18. The total number of the at least one first spline tooth 28A is greater than the total number of the at least one external spline tooth 18A. The total number of the at least one second spline tooth 30A is greater than the total number of the at least one external spline tooth 18A. The total number of the at least one first spline tooth 28A is equal to the total number of the at least one second spline tooth 30A. Alternatively, the total number of the at least one first spline tooth 28A can be less than or equal to the total number of the at least one external spline tooth 18A. The total number of the at least one second spline tooth 30A can be less than or equal to the total number of the at least one external spline tooth 18A. The total number of the at least one first spline tooth 28A can be different from the total number of the at least one second spline tooth 30A.

In the present embodiment, the at least one external spline tooth 18A is integrally provided with the tubular portion 31 as a one-piece member. The at least two external spline teeth 18A is integrally provided with the tubular portion 31 as a one-piece member. Alternatively, the at least one external spline tooth 18A can be a separate member from the tubular portion 31. The at least two external spline teeth 18A can be a separate member from the tubular portion 31.

The sprocket support body 16 is made of a first material. The tubular portion 31 and the at least one external spline tooth 18A are made of the first material. The transmitting body 26 is made of a second material. In the present embodiment, the first material has hardness higher than hardness of the second material. The weight per unit volume of the second material is lighter than the weight per unit volume of the first material. Alternatively, the hardness of the first material can be lower than or equal to the hardness of the second material. The weight per unit volume of the second material can be heavier than or equal to the weight per unit volume of the first material. For example, the first material includes iron. The second material includes aluminum. The first material can include at least one material other than iron. The second material can include at least one material other than aluminum. In a case where the second material includes aluminum, it is possible to make it easier to manufacture the transmitting body 26 even if the transmitting body 26 has a comparatively complicated shape such as a helical spline.

Figure 8:
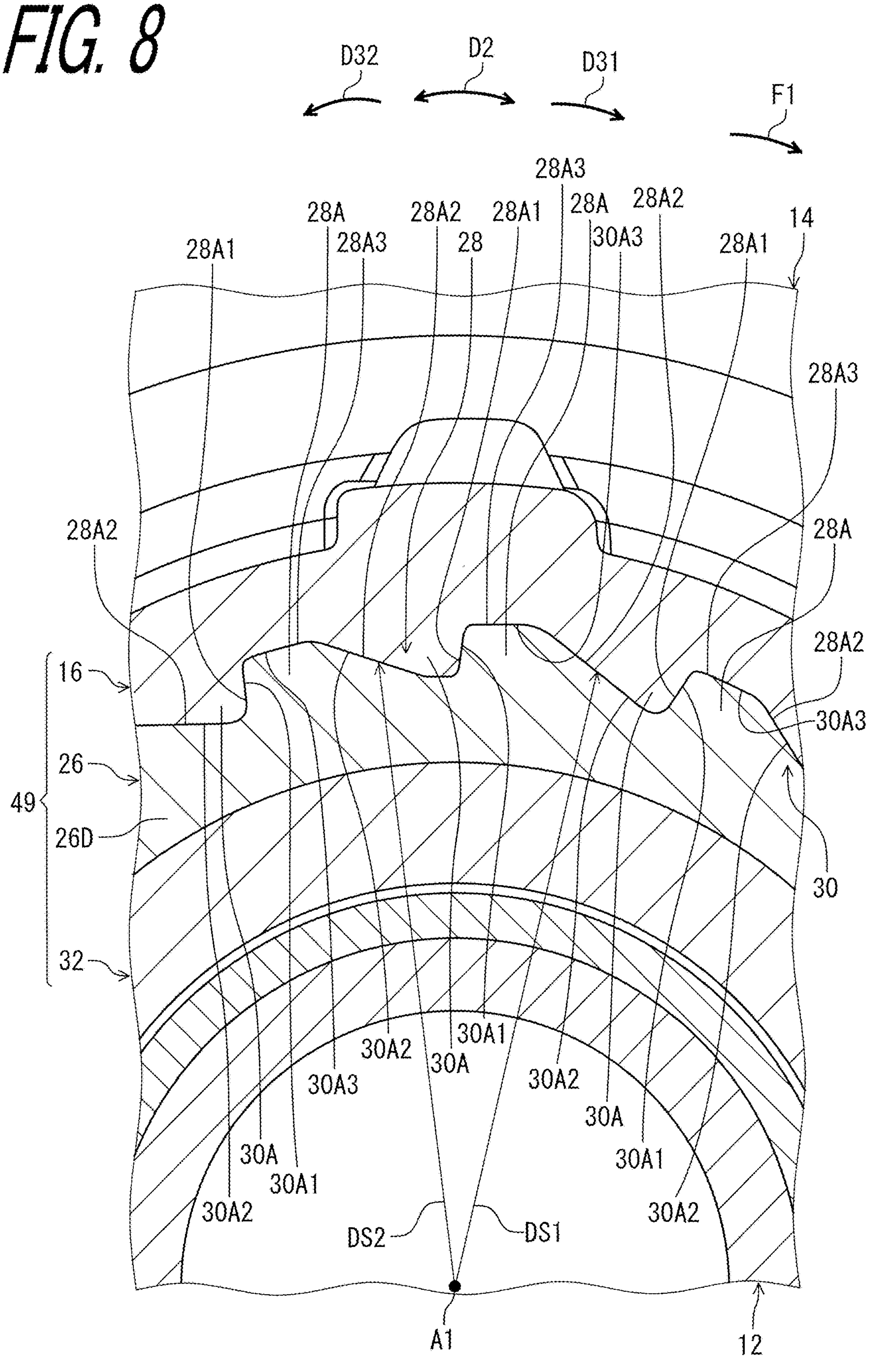
FIG. 8 is a partial cross-sectional view of the hub assembly taken along line IV-IV of FIG. 4.

As seen in FIG. 8, the at least one first spline tooth 28A includes a first contact surface 28A1 and a first inclined surface 28A2. The first contact surface 28A1 is contactable with the second spline 30 to receive the rotational force F1 from the sprocket support body 16. The first inclined surface 28A2 is inclined relative to the first contact surface 28A1. The first inclined surface 28A2 extends away from the first contact surface 28A1 to reduce a distance DS1 defined between the rotational axis A1 and the first inclined surface 28A2.

The at least one first spline tooth 28A includes a first intermediate surface 28A3. The first intermediate surface 28A3 is provided between the first contact surface 28A1 and the first inclined surface 28A2. The first intermediate surface 28A3 couples the first contact surface 28A1 and the first inclined surface 28A2. The first intermediate surface 28A3 extends in the circumferential direction D2. The first inclined surface 28A2 is inclined relative to the first intermediate surface 28A3. The first inclined surface 28A2 extends away from the first intermediate surface 28A3 to reduce the distance DS1. The first intermediate surface 28A3 can be omitted from the at least one first spline tooth 28A.

The at least one second spline tooth 30A includes a second contact surface 30A1 and a second inclined surface 30A2. The second contact surface 30A1 is contactable with the first spline 28 to transmit the rotational force F1 to the transmitting body 26. The second inclined surface 30A2 is inclined relative to the second contact surface 30A1. The second inclined surface 30A2 extends away from the second contact surface 30A1 to reduce a distance DS2 defined between the rotational axis A1 and the second inclined surface 30A2.

The at least one second spline tooth 30A includes a second intermediate surface 30A3. The second intermediate surface 30A3 is provided between the second contact surface 30A1 and the second inclined surface 30A2. The second intermediate surface 30A3 couples the second contact surface 30A1 and the second inclined surface 30A2. The second intermediate surface 30A3 extends in the circumferential direction D2. The second inclined surface 30A2 is inclined relative to the second intermediate surface 30A3. The second inclined surface 30A2 extends away from the second intermediate surface 30A3 to reduce the distance DS1. The second intermediate surface 30A3 can be omitted from the at least one second spline tooth 30A.

The first contact surface 28A1 is in contact with the second contact surface 30A1 to transmit the rotational force F1 from the sprocket support body 16 to the transmitting body 26 during pedaling. The first inclined surface 28A2 faces the second inclined surface 30A2 in a state where the first spline 28 meshes with the second spline 30. The first inclined surface 28A2 is contactable with the second inclined surface 30A2 in the state where the first spline 28 meshes with the second spline 30. The first intermediate surface 28A3 faces the second intermediate surface 30A3 in the state where the first spline 28 meshes with the second spline 30. The first intermediate surface 28A3 is contactable with the second intermediate surface 30A3 in the state where the first spline 28 meshes with the second spline 30. The inner periphery 16A of the sprocket support body 16 has a shape which is complementary with a shape of the outer periphery 26A of the transmitting body 26.

As seen in FIG. 4, the hub assembly 10 further comprises a coupling member 32. The coupling member 32 is configured to couple the sprocket support body 16 and the transmitting body 26. The coupling member 32 is configured to be engaged with the transmitting body 26. The coupling member 32 is configured to be threadedly engaged with the transmitting body 26. The sprocket support body 16, the transmitting body 26, and the coupling member 32 define a sprocket support structure 49. The coupling member 32 can be configured to directly or indirectly couple the sprocket support body 16 and the transmitting body 26.

The transmitting body 26 includes an internally threaded portion 34. The coupling member 32 includes an externally threaded portion 36. The externally threaded portion 36 is configured to be engaged with the internally threaded portion 34. The internally threaded portion 34 is at least partially provided radially inwardly of the outer periphery 26A of the transmitting body 26.

The coupling member 32 includes a positioning surface 32A. The positioning surface 32A is configured to position the sprocket support body 16 relative to the transmitting body 26 in the axial direction D1 in a coupling state where the coupling member 32 couples the sprocket support body 16 and the transmitting body 26.

The hub assembly 10 further comprises an intermediate member 38. The intermediate member 38 is provided between the sprocket support body 16 and the positioning surface 32A of the sprocket support body 16 in the axial direction D1 in the coupling state.

The transmitting body 26 includes an additional positioning surface 40. The flange portion 26F includes the additional positioning surface 40. The additional positioning surface 40 is configured to position the sprocket support body 16 relative to the transmitting body 26 in the axial direction D1 in the coupling state. The sprocket support body 16 is held between the positioning surface 32A and the additional positioning surface 40 in the axial direction D1 in the coupling state. The additional positioning surface 40 is in contact with the sprocket support body 16 in the coupling state. Another member can be provided between the sprocket support body 16 and the additional positioning surface 40 in the axial direction D1 in the coupling state.

The coupling member 32 is configured to be at least partially provided radially inwardly of the sprocket support body 16. The coupling member 32 includes a first coupling portion 42 and a second coupling portion 44. The first coupling portion 42 includes the positioning surface 32A.

The first coupling portion 42 is in contact with an inner peripheral surface 16B of the sprocket support body 16 in the coupling state. A seal member 46 is provided between the sprocket support body 16 and the first coupling portion 42. The first coupling portion 42 includes a groove 42A having an annular shape. The seal member 46 is provided in the groove 42A.

The second coupling portion 44 extends from the first coupling portion 42 in the axial direction D1. The second coupling portion 44 includes the externally threaded portion 36. The second coupling portion 44 is in contact with an inner peripheral surface 26B of the transmitting body 26 in the coupling state. A seal member 48 is provided between the transmitting body 26 and the second coupling portion 44. The seal member 48 is provided between the externally threaded portion 36 and the first coupling portion 42 in the axial direction D1. The second coupling portion 44 includes a groove 44A having an annular shape. The seal member 48 is provided in the groove 44A. The second coupling portion 44 includes the externally threaded portion 36.

As seen in FIG. 7, the coupling member 32 includes a tool engagement portion 32C to which a tool is to be engaged to rotate the coupling member 32 relative to the sprocket support body 16 and the transmitting body 26 when the sprocket support body 16, the transmitting body 26, and the coupling member 32 are assembled. The tool engagement portion 32C includes at least one recess 32D. The at least one recess 32D is configured to be engaged with the tool when the sprocket support body 16, the transmitting body 26, and the coupling member 32 are assembled.

As seen in FIG. 4, the hub assembly 10 comprises a first bearing 50. The first bearing 50 is provided radially between the hub axle 12 and the sprocket support body 16. The first bearing 50 is provided radially between the hub axle 12 and the coupling member 32. The first bearing 50 is configured to rotatably support the sprocket support body 16 and the coupling member 32 relative to the hub axle 12 about the rotational axis A1.

The hub assembly 10 comprises a first bearing 52. The first bearing 52 is provided radially between the hub axle 12 and the sprocket support body 16. The first bearing 52 is provided radially between the hub axle 12 and the coupling member 32. The first bearing 52 is configured to rotatably support the sprocket support body 16 and the coupling member 32 relative to the hub axle 12 about the rotational axis A1.

The coupling member 32 is configured to contact the first bearing 50 configured to rotatably support the coupling member 32 relative to the hub axle 12. The coupling member 32 is configured to contact the first bearing 52 configured to rotatably support the coupling member 32 relative to the hub axle 12.

The hub assembly 10 comprises a second bearing 54. The second bearing 54 is provided radially between the hub axle 12 and the transmitting body 26. The second bearing 54 is configured to rotatably support the sprocket support body 16 and the transmitting body 26 relative to the hub axle 12 about the rotational axis A1.

As seen in FIG. 3, the hub axle 12 includes an axle body 12A, a stopper 12B, and an additional stopper 12C. Namely, the hub assembly 10 further comprises the stopper 12B. Each of the axle body 12A, the stopper 12B, and the additional stopper 12C has a tubular shape. The axle body 12A includes a first axle end 12A1 and a second axle end 12A2. The axle body 12A extends between the first axle end 12A1 and the second axle end 12A2 along the rotational axis A1. The stopper 12B is coupled to the first axle end 12A1. The stopper 12B is secured to the first axle end 12A1. The additional stopper 12C is coupled to the second axle end 12A2. The additional stopper 12C is secured to the second axle end 12A2.

As seen in FIG. 4, the stopper 12B is configured to position the sprocket support body 16, the transmitting body 26, and the coupling member 32 relative to the hub axle 12 in the axial direction D1 defined along the rotational axis A1. The hub assembly 10 includes a sleeve 56. The sleeve 56 has a tubular shape. The sleeve 56 is provided radially outwardly of the axle body 12A of the hub axle 12. For example, the axle body 12A is fitted in the sleeve 56. The sprocket support body 16 is at least partially provided radially outwardly of the sleeve 56. The transmitting body 26 is at least partially provided radially outwardly of the sleeve 56. The coupling member 32 is at least partially provided radially outwardly of the sleeve 56. The second bearing 54 is provided radially outwardly of the sleeve 56. The hub axle 12 includes a positioning portion 12P. The first hub bearing 20, the sleeve 56, and the first bearings 50 and 52 are held between the positioning portion 12P and the stopper 12B. The coupling member 32 includes an additional positioning surface 32B. The additional positioning surface 32B is contactable with the first bearing 50. The transmitting body 26 includes a positioning surface 26C. The positioning surface 26C is contactable with the second bearing 54.

The sleeve 56 includes a first sleeve end 56A and a second sleeve end 56B. The sleeve 56 extends between the first sleeve end 56A and the second sleeve end 56B along the rotational axis A1. The first sleeve end 56A is in contactable with the first bearing 50. The second sleeve end 56B is in contactable with the first hub bearing 20. The second sleeve end 56B is in contactable with the second bearing 54. The first bearing 50 and the second sleeve end 56B of the sleeve 56 restrict the sprocket support body 16, the transmitting body 26, the coupling member 32, and the second bearing 54 from moving relative to the hub axle 12 in the axial direction D1.

As seen in FIG. 4, the hub assembly 10 further comprises a first seal member 57. The first seal member 57 is provided between the hub axle 12 and at least one of the sprocket support body 16 and the coupling member 32. The first seal member 57 is provided between the stopper 12B and at least one of the sprocket support body 16 and the coupling member 32 to restrict a foreign object from entering a space S1 provided between the coupling member 32 and the stopper 12B. The first bearings 50 and 52 are provided in the space S1. The first seal member 57 has an annular shape.

In the present embodiment, the first seal member 57 is provided between the stopper 12B and the sprocket support body 16 to restrict a foreign object from entering the space S1. Alternatively, the first seal member 57 can be provided between the stopper 12B and the coupling member 32 or between the stopper 12B and both the sprocket support body 16 and the coupling member 32.

The hub assembly 10 further comprises a second seal member 58. The second seal member 58 is provided between the hub body 14 and the transmitting body 26 to restrict a foreign object from entering a space S2 provided between the hub body 14 and the transmitting body 26. The one-way clutch 24 is at least partially provided in the space S2. The second seal member 58 has an annular shape. The second seal member 58 is provided radially outwardly of the transmitting body 26.

The hub assembly 10 comprises a seal stopper 59A. The seal stopper 59A is coupled to the hub body 14 to hold the second seal member 58 between the hub body 14 and the seal stopper 59A. The seal stopper 59A is detachably and reattachably coupled to the hub body 14. For example, the seal stopper 59A includes a snap ring. The seal stopper 59A extends circumferentially.

The hub assembly 10 further comprises a dust cover 59B. The dust cover 59B is configured to be mounted to the transmitting body 26. The hub assembly 10 further comprises a cover stopper 59C. The cover stopper 59C is coupled to the sprocket support body 16 to hold the dust cover 59B between the transmitting body 26 and the cover stopper 59C. The cover stopper 59C is detachably and reattachably coupled to the transmitting body 26. For example, the dust cover 59B has an annular shape. The cover stopper 59C includes a snap ring. The seal stopper 59A extends circumferentially.

Figure 9:
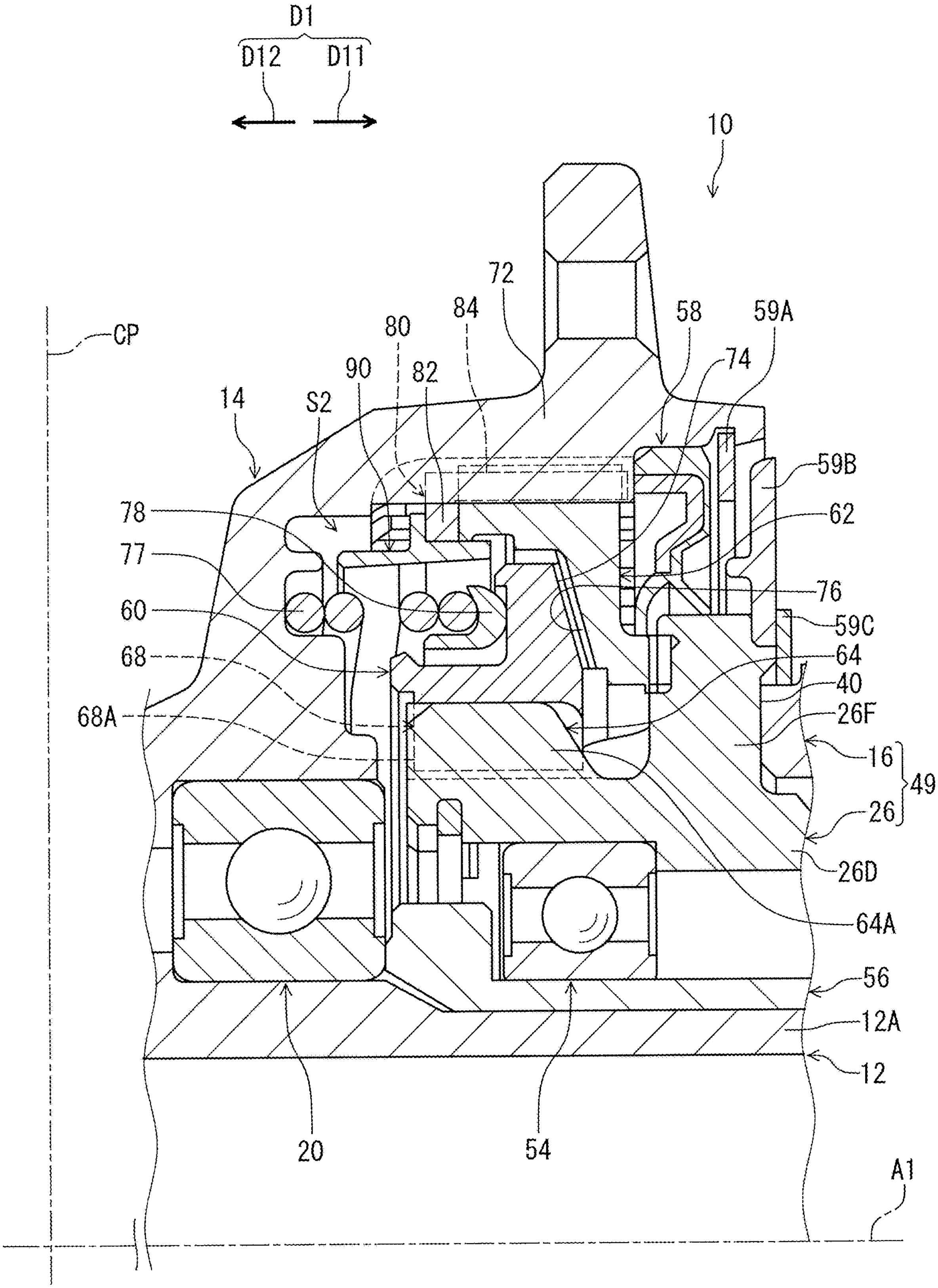
FIG. 9 is a partial cross-sectional view of the hub assembly taken along line IX-IX of FIG. 2.

As seen in FIG. 9, the one-way clutch 24 includes a first ratchet member 60 and a second ratchet member 62. The first ratchet member 60 is coupled to the transmitting body 26 to rotate along with the transmitting body 26 relative to the hub body 14. The second ratchet member 62 is coupled to the hub body 14 to rotate along with the hub body 14 relative to the transmitting body 26.

Figure 10:
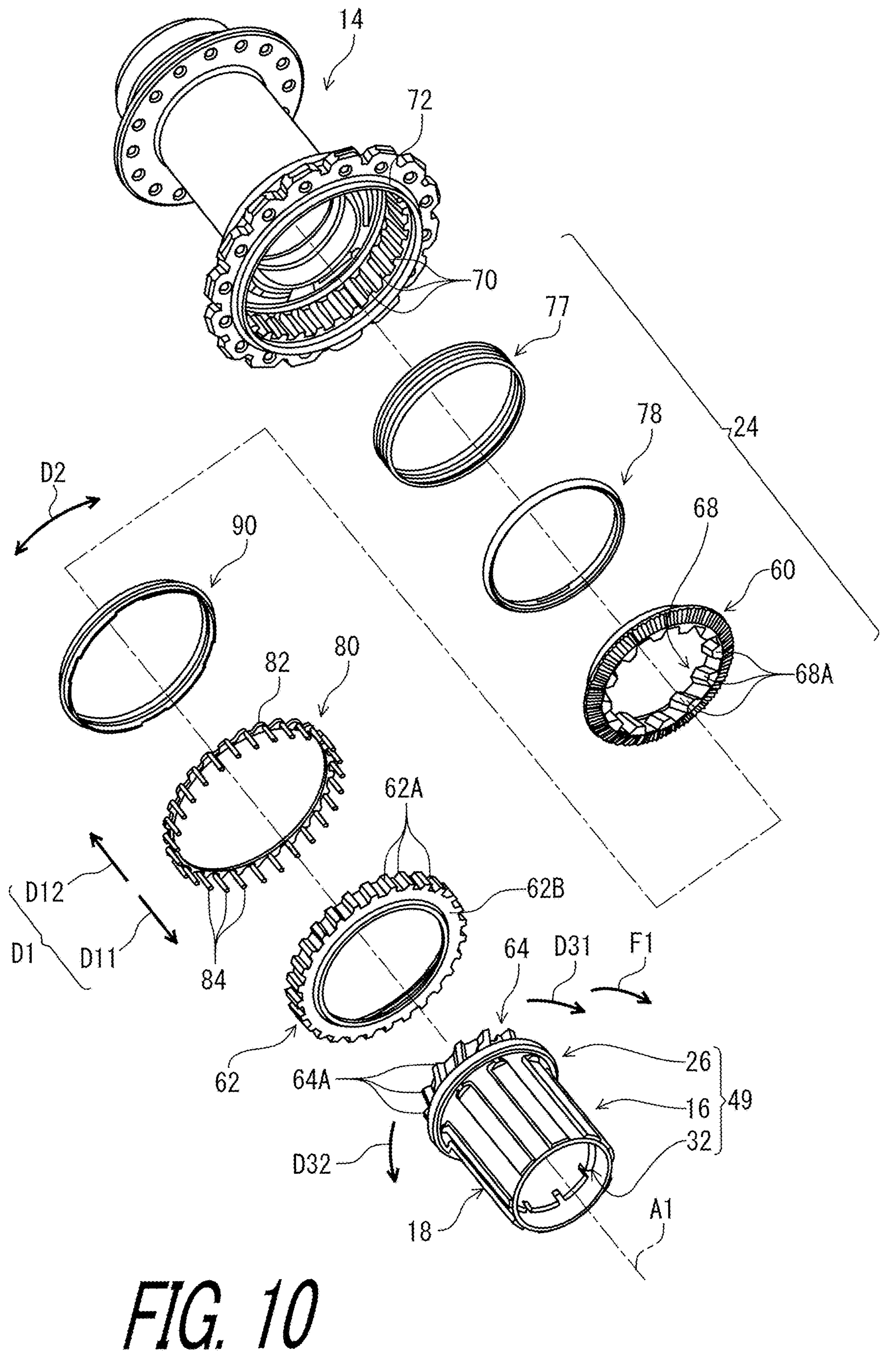
FIG. 10 is an exploded perspective view of a part of the hub assembly illustrated in FIG. 1.

As seen in FIG. 10, the transmitting body 26 includes a helical spline 64. The helical spline 64 includes at least one first helical spline tooth 64A. In the present embodiment, the helical spline 64 includes at least two first helical spline teeth 64A. The at least two first helical spline teeth 64A are arranged in the circumferential direction D2.

As seen in FIG. 9, the helical spline 64 is configured to be engaged with the first ratchet member 60 to movably support the first ratchet member 60 in the axial direction D1 in response to relative rotation between the transmitting body 26 and the first ratchet member 60.

As seen in FIG. 10, the first ratchet member 60 includes an additional helical spline 68. The additional helical spline 68 is configured to be engaged with the helical spline 64. The additional helical spline 68 includes at least one second helical spline tooth 68A. In the present embodiment, the additional helical spline 68 includes at least two second helical spline teeth 68A. However, the total number of the at least one second helical spline tooth 68A is not limited to the illustrated embodiment.

Figure 11:
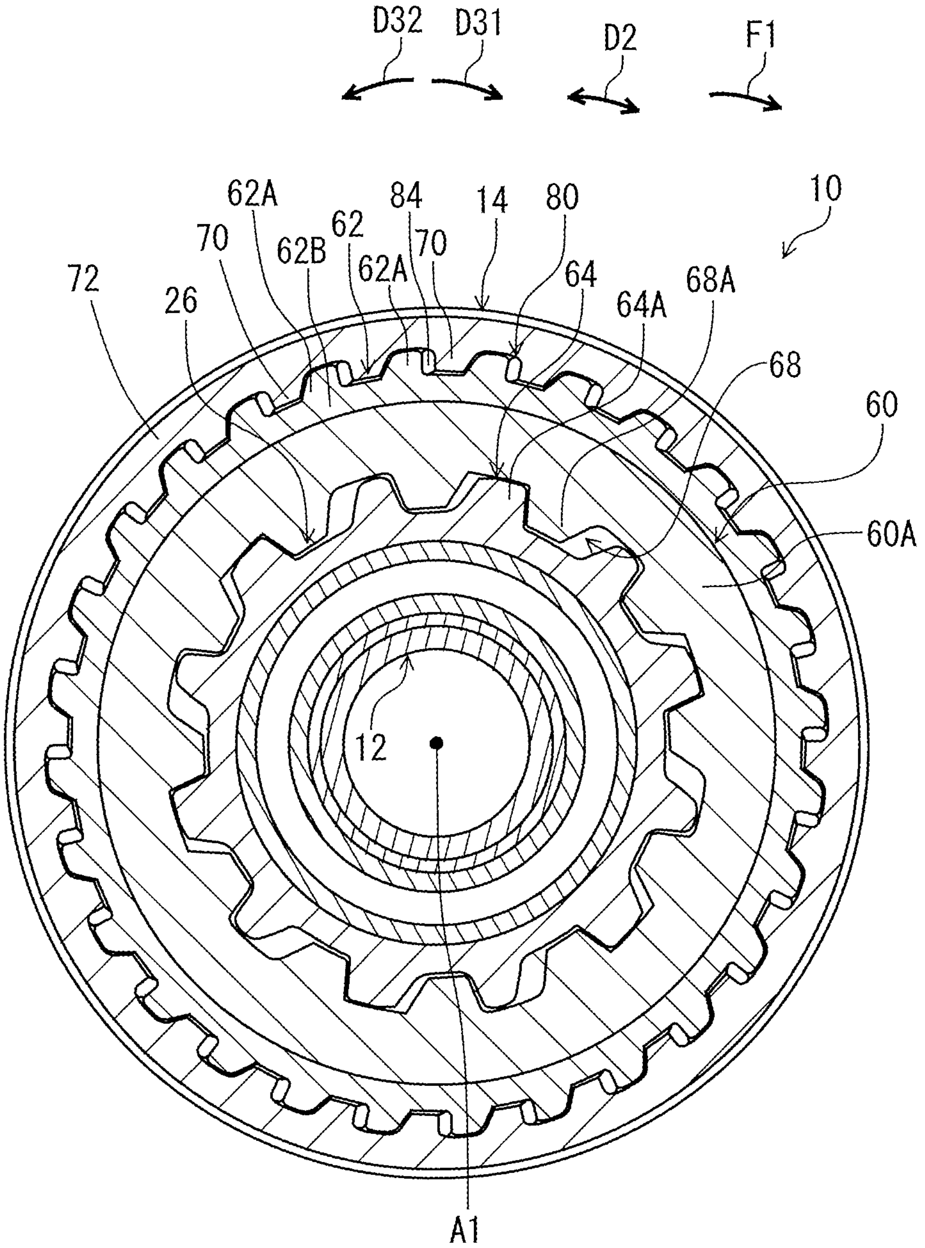
FIG. 11 is a partial cross-sectional view of the hub assembly taken along line XI-XI of FIG. 4.

As seen in FIG. 11, the helical spline 64 and the additional helical spline 68 are engaged to transmit the rotational force F1 between the transmitting body 26 and the first ratchet member 60. The at least one first helical spline tooth 64A and the at least one second helical spline tooth 68A mesh to transmit the rotational force F1 between the transmitting body 26 and the first ratchet member 60. The at least two first helical spline teeth 64A and the at least two second helical spline teeth 68A mesh to transmit the rotational force F1 between the transmitting body 26 and the first ratchet member 60.

The first ratchet member 60 includes a first base portion 60A. For example, the first base portion 60A has an annular shape. The additional helical spline 68 is provided radially inwardly of the first base portion 60A. The at least one second helical spline tooth 68A protrudes radially inwardly from the first base portion 60A. The at least two second helical spline teeth 68A protrude radially inwardly from the first base portion 60A. The shape of the first base portion 60A is not limited to the illustrated embodiment.

As seen in FIG. 10, the second ratchet member 62 includes at least one second tooth 62A. In the present embodiment, the second ratchet member 62 includes at least two second teeth 62A. However, the total number of the at least one second tooth 62A is not limited to the illustrated embodiment.

The hub body 14 includes at least one first tooth 70. The hub body 14 includes a tubular portion 72. The at least one first tooth 70 protrudes radially inwardly from the tubular portion 72. In the present embodiment, the hub body 14 includes at least two first teeth 70. The at least two first tooth 70 protrude radially inwardly from the tubular portion 72. However, the total number of the at least one first tooth 70 is not limited to the illustrated embodiment.

As seen in FIG. 11, the second ratchet member 62 includes a second base portion 62B. For example, the second base portion 62B has an annular shape. The at least one second tooth 62A protrudes radially outwardly from the second base portion 62B. The at least two second teeth 62A protrude radially outwardly from the second base portion 62B. The shape of the second base portion 62B is not limited to the illustrated embodiment.

The at least one second tooth 62A is configured to be engaged with the at least one first tooth 70. The at least one first tooth 70 and the at least one second tooth 62A mesh to transmit the rotational force F1 between the hub body 14 and the second ratchet member 62. The at least two second teeth 62A are configured to be engaged with the at least two first teeth 70. The at least two first teeth 70 and the at least two second teeth 62A mesh to transmit the rotational force F1 between the hub body 14 and the second ratchet member 62.

Figure 12:
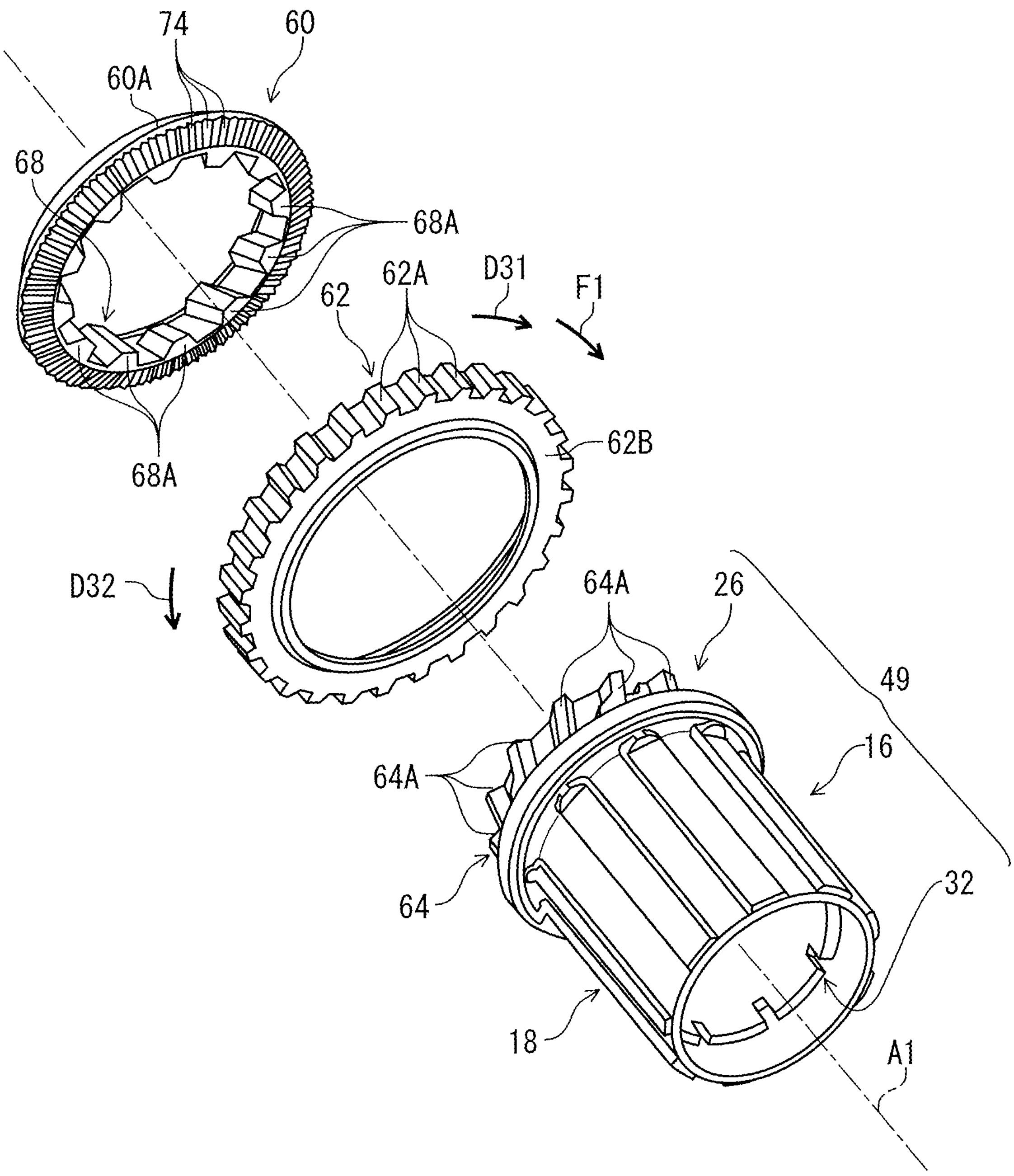
FIG. 12 is an exploded perspective view of a part of the hub assembly illustrated in FIG. 1.

As seen in FIG. 12, the first ratchet member 60 includes at least one first ratchet tooth 74. The at least one first ratchet tooth 74 protrudes from the first base portion 60A toward the second ratchet member 62. In the present embodiment, the first ratchet member 60 includes at least two first ratchet teeth 74. The at least two first ratchet teeth 74 protrude from the first base portion 60A toward the second ratchet member 62. However, the total number of the at least one first ratchet tooth 74 is not limited to the illustrated embodiment.

Figure 13:
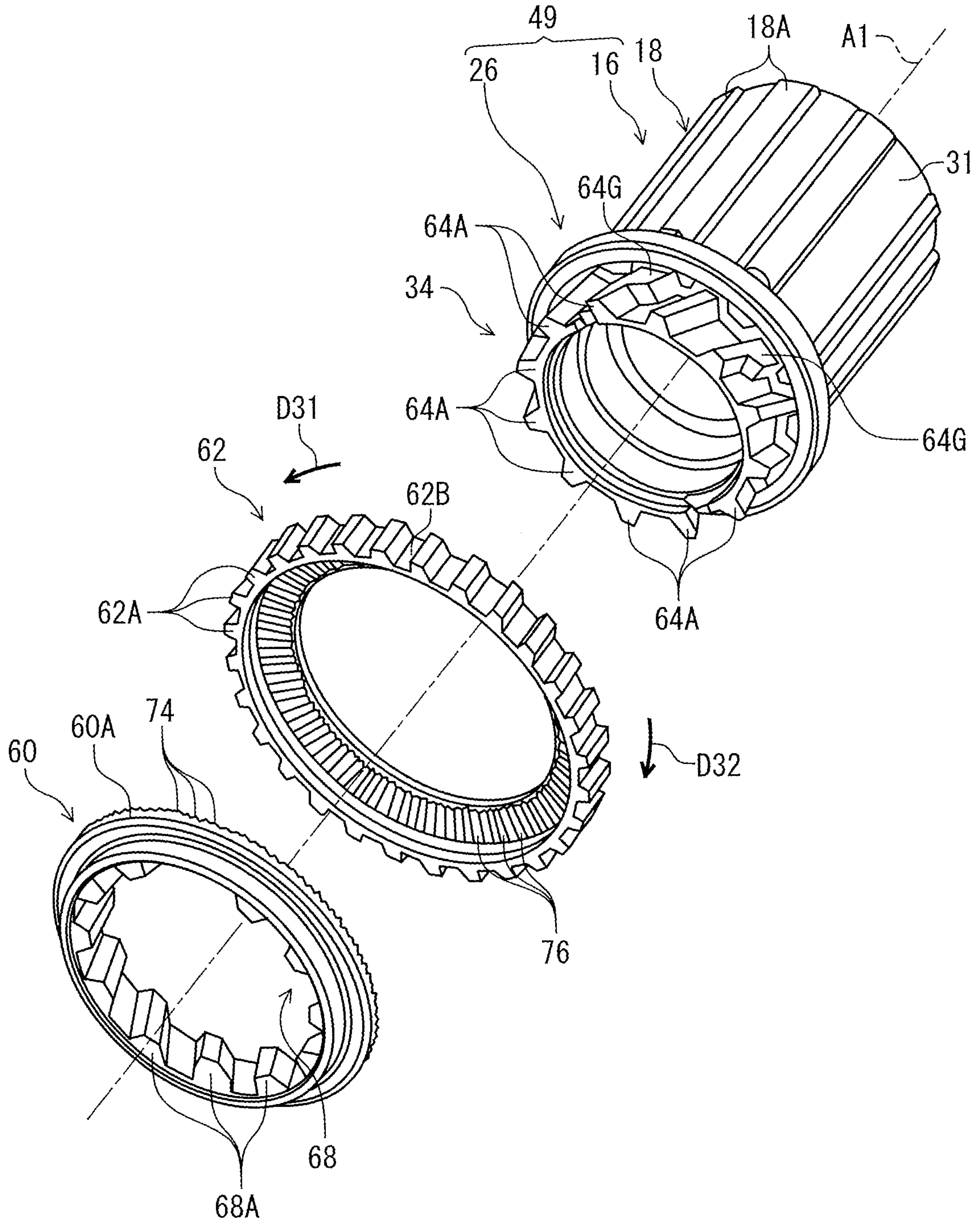
FIG. 13 is an exploded perspective view of a part of the hub assembly illustrated in FIG. 1.

As seen in FIG. 13, the second ratchet member 62 includes at least one second ratchet tooth 76. The at least one second ratchet tooth 76 protrudes from the second base portion 62B toward the first ratchet member 60. In the present embodiment, the second ratchet member 62 includes at least two second ratchet teeth 76. The at least two second ratchet teeth 76 protrude from the second base portion 62B toward the first ratchet member 60. However, the total number of the at least one second ratchet tooth 76 is not limited to the illustrated embodiment.

As seen in FIG. 9, the at least one second ratchet tooth 76 is configured to be engaged with the at least one first ratchet tooth 74. The at least one first ratchet tooth 74 and the at least one second ratchet tooth 76 are configured to mesh to transmit the rotational force F1 (see e.g., FIGS. 12 and 13) between the first ratchet member 60 and the second ratchet member 62. The at least two second ratchet teeth 76 are configured to be engaged with the at least two first ratchet teeth 74. The at least two first ratchet teeth 74 and the at least two second ratchet teeth 76 are configured to mesh to transmit the rotational force F1 (see e.g., FIGS. 12 and 13) between the first ratchet member 60 and the second ratchet member 62.

The one-way clutch 24 includes a biasing member 77. The biasing member 77 is provided between the hub body 14 and the first ratchet member 60 in the axial direction D1 to bias the first ratchet member 60 toward the second ratchet member 62 in the axial direction D1. The axial direction D1 includes a first axial direction D11 and a second axial direction D12. The second axial direction D12 is an opposite direction of the first axial direction D11. The biasing member 77 is configured to bias the first ratchet member 60 toward the second ratchet member 62 in the first axial direction D11. In the present embodiment, the biasing member 77 includes a spring. However, the biasing member 77 can include another member other than the spring if needed or desired.

The hub assembly 10 comprises a receiving member 78. The receiving member 78 is provided between the first ratchet member 60 and the biasing member 77 in the axial direction D1. The receiving member 78 is pressed against the first ratchet member 60 by the biasing member 77. The receiving member 78 is in slidable contact with the first ratchet member 60.

As seen in FIG. 10, the one-way clutch 24 includes a spacer 80. The spacer 80 includes at least one base member 82 and at least one axial projection 84. The at least one base member 82 extends in the circumferential direction D2. The at least one axial projection 84 extends from the at least one base member 82 in the axial direction D1.

As seen in FIG. 11, the at least one axial projection 84 is provided between the at least one second tooth 62A of the second ratchet member 62 and the at least one first tooth 70 of the hub body 14.

As seen in FIG. 10, the one-way clutch 24 includes a supporting member 90. As seen in FIG. 9, the supporting member 90 is configured to push the spacer 80 toward the second ratchet member 37 in the axial direction D1. The supporting member 90 is coupled to the second ratchet member 37 to restrict the spacer 80 from moving relative to the second ratchet member 37 in the axial direction D1.

Figure 14:
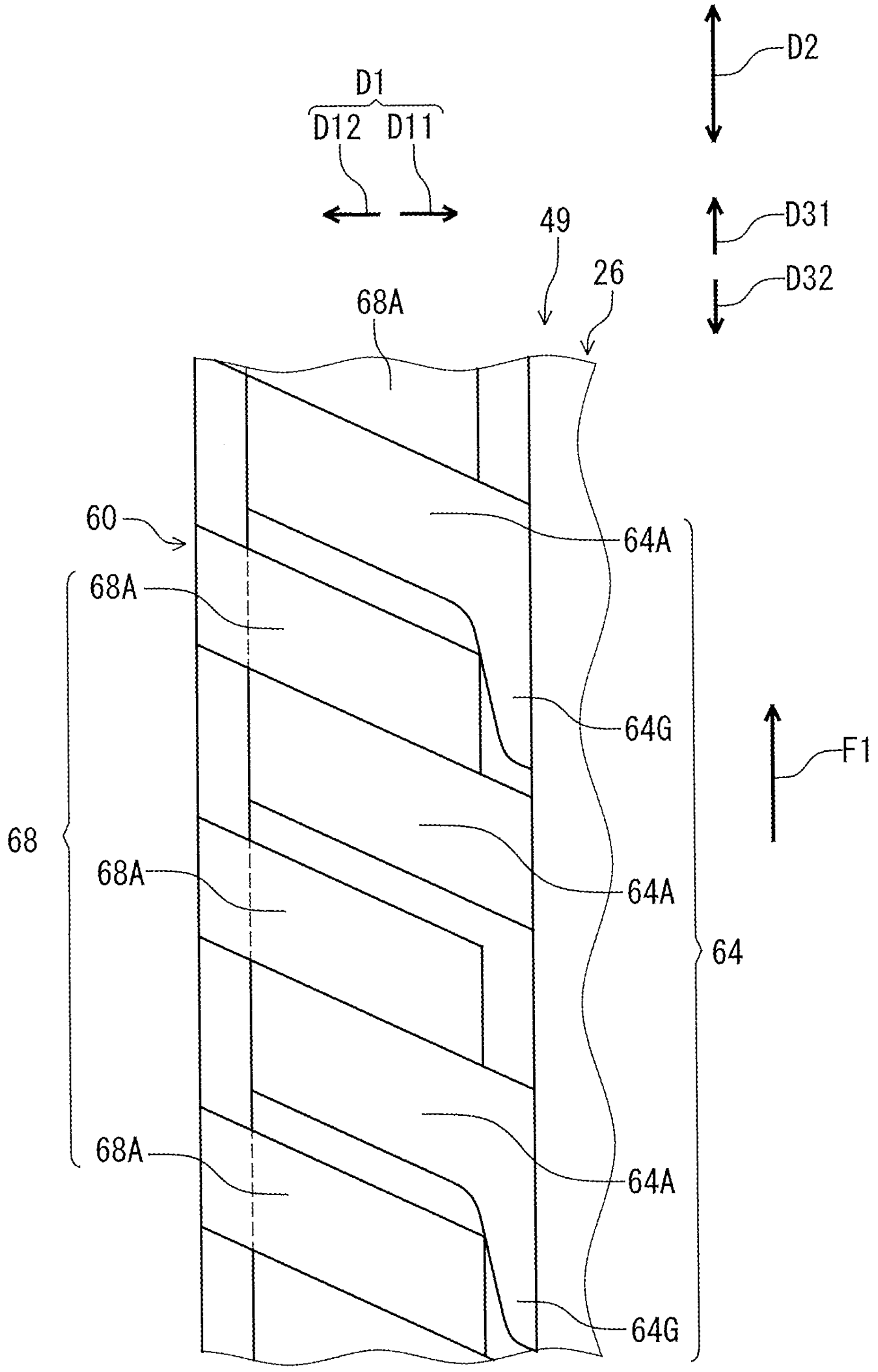
FIG. 14 is a schematic diagram showing an action of a first ratchet member and a sprocket support body of the hub assembly illustrated in FIG. 1 (pedaling).

As seen in FIG. 14, when the rotational force F1 is input to the sprocket support body 16 (see e.g., FIG. 2) in the first rotational direction D31, the at least one second helical spline tooth 68A is guided by the at least one first helical spline tooth 64A relative to the sprocket support structure 49 in the first axial direction D11. As seen in FIG. 9, this strongly brings the at least two first ratchet teeth 74 into engagement with the at least two second ratchet teeth 76. In this state, the rotational force F1 (see e.g., FIG. 14) is transmitted from the sprocket support structure 49 to the hub body 14 (see e.g., FIG. 9) via the first ratchet member 60 and the second ratchet member 62 (see e.g., FIG. 9).

Figure 15:
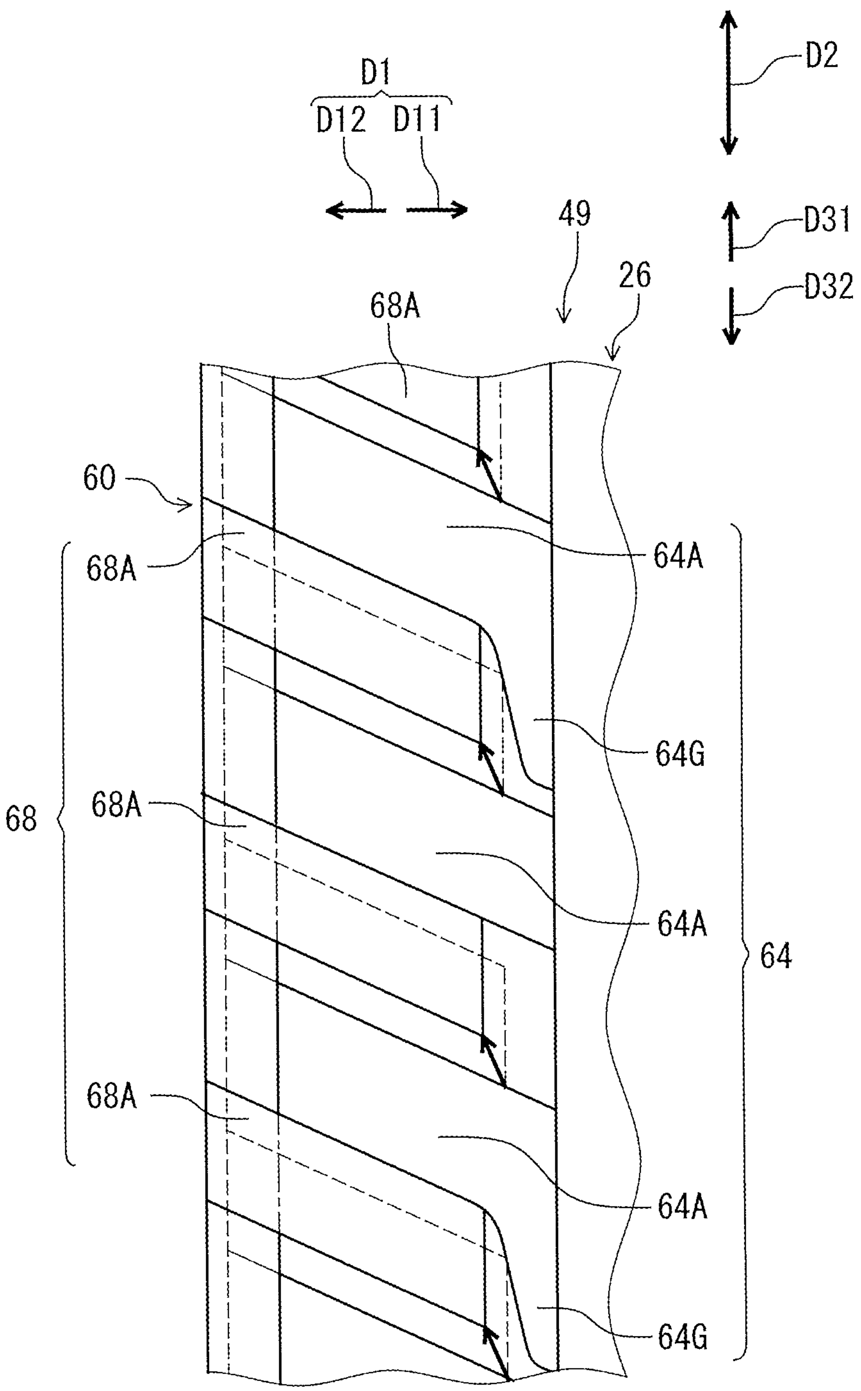
FIG. 15 is a schematic diagram showing an action of a first ratchet member and a sprocket support body of the hub assembly illustrated in FIG. 1 (coasting).

As seen in FIG. 15, the helical spline 64 includes at least one guiding portion 64G. The guiding portion 64G protrudes from one of the at least one first helical spline tooth 64A in at least the circumferential direction D2. The at least one guiding portion 64G is configured to move the first ratchet member 60 away from the second ratchet member 62 in the second axial direction D12 during coasting or freewheeling. The at least one guiding portion 64G is configured to move the first ratchet member 60 against the biasing force of the biasing member 77 during coasting or freewheeling. As seen in FIG. 10, this allows the hub body 14 and the second ratchet member 62 to rotate relative to the sprocket support body 16 and the first ratchet member 60 in the first rotational direction D31.

As seen in FIGS. 10 and 15, rotation of the sprocket support structure 49 and the sprocket assembly 8 (see e.g., FIG. 2) is stopped during coasting since rotation of a crank is stopped while the human-powered vehicle 2 travels forward. The hub body 14 and the second ratchet member 62 rotate in the first rotational direction D31 while the rotation of the sprocket support structure 49 and the sprocket assembly 8 (see e.g., FIG. 2) is stopped during coasting. When the hub body 14 and the second ratchet member 62 rotate relative to the sprocket support structure 49 in the first rotational direction D31, as seen in FIG. 15, the at least one guiding portion 64G and the at least one first helical spline tooth 64A guide the at least one second helical spline tooth 68A in the second axial direction D12. Thus, the first ratchet member 60 is moved relative to the second ratchet member 62 in the second axial direction D12 during coasting against the biasing force of the biasing member 77, reducing the engagement between the at least two first ratchet teeth 74 and the at least two second ratchet teeth 76. This allows the second ratchet member 62 to rotate relative to the first ratchet member 60 in the first rotational direction D31 while the at least one first ratchet tooth 74 of the first ratchet member 60 slides with the at least one second ratchet tooth 76 of the second ratchet member 62. Thus, the hub body 14 is rotatable relative to the sprocket support structure 49 in the first rotational direction D31 during coasting.

In the present embodiment and the modifications thereof, the transmitting body 26 is not included in the one-way clutch 24. However, the one-way clutch 24 can include the transmitting body 26 if needed or desired.

Figure 16:
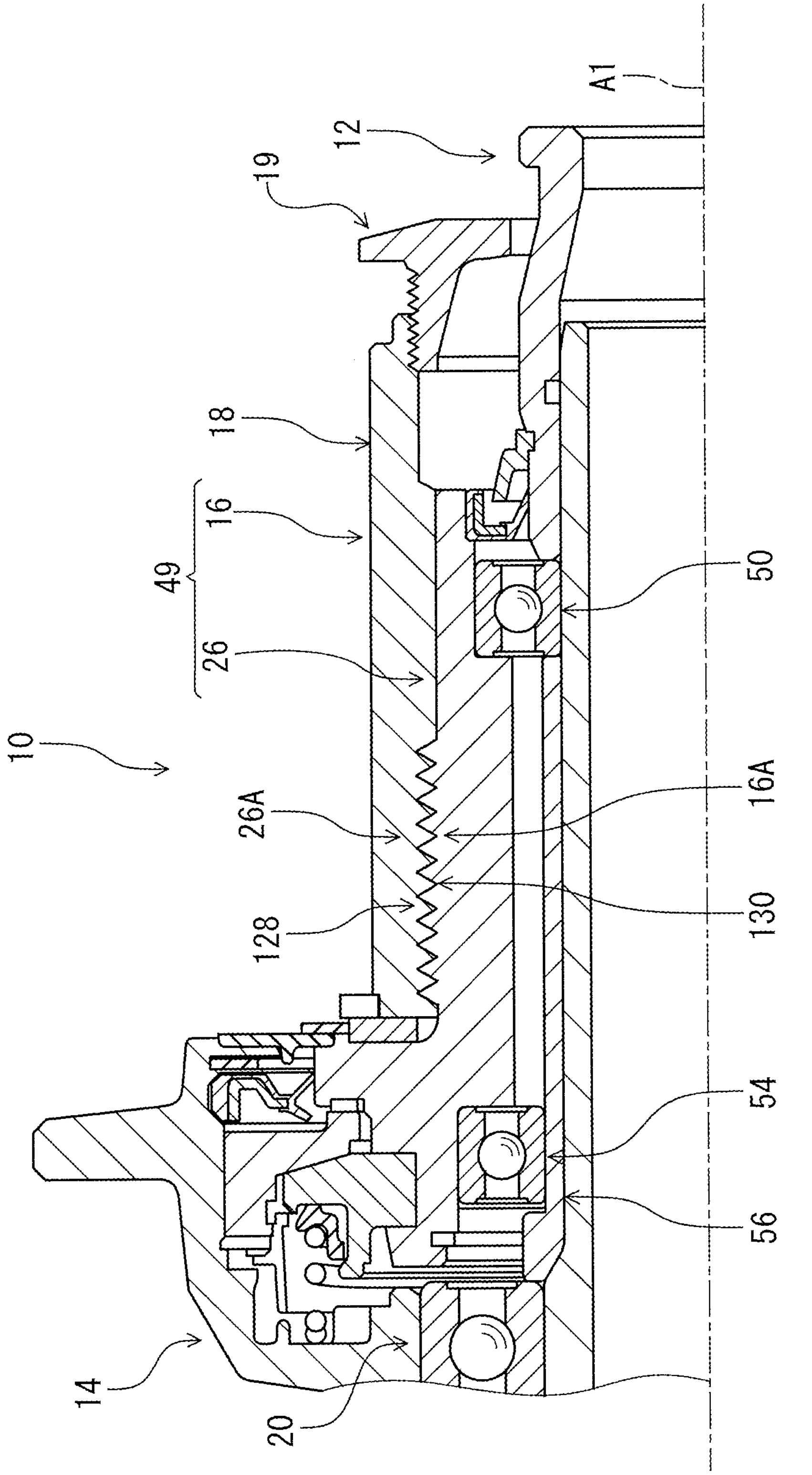
FIG. 16 is a partial cross-sectional view of a hub assembly in accordance with a modification.

In the present and the modifications thereof, as seen in FIG. 16, the outer periphery 26A of the transmitting body 26 can include a first externally threaded portion 128 instead of the first spline 28. The inner periphery 16A of the sprocket support body 16 can include a second internally threaded portion 130 configured to be engaged with the first externally threaded portion 128 instead of the second spline 30. In this modification, the coupling member 32 can be omitted from the hub assembly 10.

In the present application, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

The phrase "at least one of" as used in this disclosure means "one or more" of a desired choice. For one example, the phrase "at least one of" as used in this disclosure means "only one single choice" or "both of two choices" if the number of its choices is two. For other example, the phrase "at least one of" as used in this disclosure means "only one single choice" or "any combination of equal to or more than two choices" if the number of its choices is equal to or more than three. For instance, the phrase "at least one of A and B" encompasses (1) A alone, (2), B alone, and (3) both A and B. The phrase "at least one of A, B, and C" encompasses (1) A alone, (2), B alone, (3) C alone, (4) both A and B, (5) both B and C, (6) both A and C, and (7) all A, B, and C. In other words, the phrase "at least one of A and B" does not mean "at least one of A and at least one of B" in this disclosure.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. A hub assembly comprising:

a hub axle;

a hub body rotatable relative to the hub axle about a rotational axis;

a sprocket support body rotatable relative to the hub axle about the rotational axis, the sprocket support body including an external spline configured to be engaged with an internal spline of a sprocket assembly of a human-powered vehicle, and an inner periphery;

a one-way clutch configured to restrict the sprocket support body from rotating relative to the hub body in a first rotational direction, the one-way clutch being configured to allow the sprocket support body to rotate relative to the hub body in a second rotational direction which is an opposite direction of the first rotational direction; and a transmitting body provided between the sprocket support body and the one-way clutch to transmit rotational force from the sprocket support body to the one-way clutch, the transmitting body being a separate member from the sprocket support body, the transmitting body including an outer periphery configured to be engaged with the inner periphery of the sprocket support body.

2. The hub assembly according to claim 1, wherein the sprocket support body is made of a first material, the transmitting body is made of a second material, and the first material has hardness higher than hardness of the second material.

3. The hub assembly according to claim 1, wherein the one-way clutch includes a first ratchet member and a second ratchet member, the first ratchet member being coupled to the transmitting body to rotate along with the transmitting body relative to the hub body, the second ratchet member being coupled to the hub body to rotate along with the hub body relative to the transmitting body.

4. The hub assembly according to claim 3, wherein the transmitting body includes a helical spline configured to be engaged with the first ratchet member to movably support the first ratchet member in an axial direction in response to relative rotation between the transmitting body and the first ratchet member, the axial direction being defined along the rotational axis.

5. The hub assembly according to claim 1, wherein the sprocket support body includes a tubular portion extending circumferentially about the rotational axis, and the external spline includes at least one external spline tooth protruding radially outwardly from the tubular portion to be engaged with the internal spline of the sprocket assembly.

6. The hub assembly according to claim 1, wherein the outer periphery of the transmitting body includes a first spline configured to be free of being engaged with the internal spline of the sprocket assembly, and the inner periphery of the sprocket support body includes a second spline configured to be engaged with the first spline.

7. The hub assembly according to claim 6, wherein the first spline includes at least one first spline tooth, and the at least one first spline tooth includes a first contact surface contactable with the second spline to receive rotational force from the sprocket support body, and a first inclined surface inclined relative to the first contact surface, the first inclined surface extending away from the first contact surface to reduce a distance defined between the rotational axis and the first inclined surface.

8. The hub assembly according to claim 1, wherein the outer periphery of the transmitting body includes a first externally threaded portion, and the inner periphery of the sprocket support body includes a second internally threaded portion configured to be engaged with the first externally threaded portion.

9. The hub assembly according to claim 1, further comprising a coupling member configured to couple the sprocket support body and the transmitting body.

10. The hub assembly according to claim 9, wherein the coupling member is configured to be engaged with the transmitting body.

11. The hub assembly according to claim 9, wherein the coupling member is configured to be threadedly engaged with the transmitting body.

12. The hub assembly according to claim 9, wherein the coupling member includes a positioning surface configured to position the sprocket support body relative to the transmitting body in an axial direction in a coupling state where the coupling member couples the sprocket support body and the transmitting body, the axial direction being defined along the rotational axis.

13. The hub assembly according to claim 12, further comprising an intermediate member provided between the sprocket support body and the positioning surface of the sprocket support body in the axial direction in the coupling state.

14. The hub assembly according to claim 9, wherein the coupling member is configured to contact a first bearing configured to rotatably support the coupling member relative to the hub axle.

15. The hub assembly according to claim 9, further comprising:

a stopper configured to position the sprocket support body, the transmitting body, and the coupling member relative to the hub axle in an axial direction defined along the rotational axis; and a first seal member provided between the stopper and at least one of the sprocket support body and the coupling member to restrict a foreign object from entering a space provided between the coupling member and the stopper.

16. The hub assembly according to claim 1, further comprising a seal member provided between the hub body and the transmitting body to restrict a foreign object from entering a space provided between the hub body and the transmitting body.

17. The hub assembly according to claim 1, wherein the transmitting body is configured to contact a bearing configured to rotatably support the transmitting body relative to the hub axle.

18. A wheel comprising:

the hub assembly according to claim 1.

19. A hub assembly comprising:

a hub axle;

a hub body rotatable relative to the hub axle about a rotational axis;

a sprocket support body rotatable relative to the hub axle about the rotational axis, the sprocket support body including an external spline configured to be engaged with an internal spline of a sprocket assembly of a human-powered vehicle, the sprocket support body being made of a first material;

a one-way clutch configured to restrict the sprocket support body from rotating relative to the hub body in a first rotational direction, the one-way clutch being configured to allow the sprocket support body to rotate relative to the hub body in a second rotational direction which is an opposite direction of the first rotational direction; and a transmitting body provided between the sprocket support body and the one-way clutch to transmit rotational force from the sprocket support body to the one-way clutch, the transmitting body being made of a second material, the first material having hardness higher than hardness of the second material.

20. A hub assembly comprising:

a hub axle;

a hub body rotatable relative to the hub axle about a rotational axis;

a sprocket support body rotatable relative to the hub axle about the rotational axis, the sprocket support body including an external spline configured to be engaged with an internal spline of a sprocket assembly of a human-powered vehicle;

a one-way clutch configured to restrict the sprocket support body from rotating relative to the hub body in a first rotational direction, the one-way clutch being configured to allow the sprocket support body to rotate relative to the hub body in a second rotational direction which is an opposite direction of the first rotational direction; and a transmitting body provided between the sprocket support body and the one-way clutch to transmit rotational force from the sprocket support body to the one-way clutch, the one-way clutch including a first ratchet member and a second ratchet member, the first ratchet member being coupled to the transmitting body to rotate along with the transmitting body relative to the hub body, the second ratchet member being coupled to the hub body to rotate along with the hub body relative to the transmitting body.

* * * * *